United States Patent
Fetterman et al.

(10) Patent No.: US 10,095,548 B2
(45) Date of Patent: Oct. 9, 2018

(54) MECHANISM FOR WAKING COMMON RESOURCE REQUESTS WITHIN A RESOURCE MANAGEMENT SUBSYSTEM

(75) Inventors: Michael Fetterman, Boxborough, MA (US); Shirish Gadre, Fremont, CA (US); John H. Edmondson, Arlington, MA (US); Omkar Paranjape, Austin, TX (US); Anjana Rajendran, San Jose, CA (US); Eric Lyell Hill, Palo Alto, CA (US); Rajeshwaran Selvanesan, Milpitas, CA (US); Charles McCarver, Madison, AL (US); Kevin Mitchell, Madison, AL (US); Steven James Heinrich, Madison, AL (US)

(73) Assignee: NVIDIA CORPORATION, Santa Clara, CA (US)

( * ) Notice: Subject to any disclaimer, the term of this patent is extended or adjusted under 35 U.S.C. 154(b) by 576 days.

(21) Appl. No.: 13/476,848

(22) Filed: May 21, 2012

(65) Prior Publication Data
US 2013/0311996 A1 Nov. 21, 2013

(51) Int. Cl.
*G06F 9/46* (2006.01)
*G06F 9/50* (2006.01)

(52) U.S. Cl.
CPC ...... *G06F 9/5016* (2013.01); *G06F 2209/503* (2013.01)

(58) Field of Classification Search
USPC ............................ 718/104; 711/150; 710/261
See application file for complete search history.

(56) References Cited

U.S. PATENT DOCUMENTS

| | | | |
|---|---|---|---|
| 5,305,448 A * | 4/1994 | Insalaco et al. | 711/164 |
| 5,377,352 A * | 12/1994 | Tanaka | G06F 9/4881 |
| | | | 712/244 |
| 5,974,523 A | 10/1999 | Glew et al. | |
| 6,026,427 A * | 2/2000 | Nishihara et al. | 718/106 |
| 7,685,403 B1 * | 3/2010 | Coon et al. | 712/24 |
| 7,689,998 B1 * | 3/2010 | Chrysanthakopoulos | 718/104 |
| 7,844,782 B2 * | 11/2010 | Pope et al. | 711/150 |
| 8,443,371 B2 * | 5/2013 | Chen et al. | 718/104 |
| 8,868,951 B2 * | 10/2014 | Vash | G06F 13/00 |
| | | | 713/320 |
| 2004/0153763 A1 | 8/2004 | Grochowski et al. | |

(Continued)

*Primary Examiner* — Kenneth Tang
(74) *Attorney, Agent, or Firm* — Artegis Law Group, LLP

(57) ABSTRACT

One embodiment of the present disclosure sets forth an effective way to maintain fairness and order in the scheduling of common resource access requests related to replay operations. Specifically, a streaming multiprocessor (SM) includes a total order queue (TOQ) configured to schedule the access requests over one or more execution cycles. Access requests are allowed to make forward progress when needed common resources have been allocated to the request. Where multiple access requests require the same common resource, priority is given to the older access request. Access requests may be placed in a sleep state pending availability of certain common resources. Deadlock may be avoided by allowing an older access request to steal resources from a younger resource request. One advantage of the disclosed technique is that older common resource access requests are not repeatedly blocked from making forward progress by newer access requests.

21 Claims, 14 Drawing Sheets

(56) References Cited

U.S. PATENT DOCUMENTS

2004/0216112 A1   10/2004  Accapadi et al.
2005/0091656 A1*  4/2005  Wilhelm, Jr. ................. 718/100
2005/0125793 A1*  6/2005  Aguilar et al. ............... 718/100

* cited by examiner

MECHANISM FOR WAKING COMMON RESOURCE REQUESTS WITHIN A RESOURCE MANAGEMENT SUBSYSTEM

BACKGROUND OF THE INVENTION

Field of the Invention

The present invention generally relates to computer architectures and, more specifically, to a mechanism for waking common resource requests within a resource management subsystem.

Description of the Related Art

A common practice in parallel processing systems is to design a processor that executes some number of threads simultaneously. Each thread may execute in a separate execution pipeline within the processor. As execution proceeds in parallel, different threads may request access a common resource, such as a shared memory, in a manner that may cause the threads to encounter a resource conflict. For example, multiple threads may execute a common resource access operation, such as a memory load instruction, where the multiple threads cannot simultaneously access the resource. In such a case, at least one thread is allowed to access the common resource and complete the common resource access operation. The pipeline transfers a copy of the common resource, such as one of the cache lines that some of the threads are accessing, and those threads are able to complete the common resource access operation. However, the other threads accessing the same common resource are not allowed to complete the common resource access operation and remain unserviced. Thus, some threads are allowed to complete the common resource access operation, while other threads are not. Absent a means to process multiple threads accessing a common resource, the operation is not able to complete successfully.

One approach to servicing multiple threads accessing a common resource is to allocate the resource to one or more threads until the common resource has no additional available access ports. Remaining threads accessing the same resource are placed in a pending state awaiting availability of the common resource. When the common resource has one or more available access ports, the common resource is allocated to one or more pending requests for servicing until all access ports have again been allocated. The process continues until all requests to the common resource have been serviced.

One drawback of this approach is that new requests may continue to arrive and consume access ports to the common resource while pending requests awaiting the same common resource remain unserviced. Such an occurrence, when newer requests accessing a common resource are serviced before pending requests, is called a "priority inversion." Another drawback of this approach is that a pending request may be selected for servicing when a common resource becomes available. However, due to pipeline latency, another newer request may consume the common resource before the pending request is able to complete the common resource access operation. Yet another drawback of this approach is that a request may require access to two common resources, A and B, where A is available but B is not. The request is placed in a pending state until B becomes available. When B becomes available, the pending request is scheduled for completion. However, due to pipeline latency, another newer request may consume the A before the pending request is able to complete the common resource access operation. When newer access requests are continually allocated resources before older existing access requests, the older access requests may not be able to make forward progress and thus are not able to complete execution.

As the foregoing illustrates, what is needed in the art is a more effective way to service threads accessing a common resource.

SUMMARY OF THE INVENTION

One embodiment of the present invention sets forth a computer-implemented method for scheduling common resource access requests. The method includes receiving a first request for a common resource, determining that the common resource is not available for allocation to requests, and in response, delaying servicing the first request. The method further includes, subsequent to delaying servicing, receiving a second request for the common resource, and, subsequent to receiving the second request, determining that the common resource has become available for allocation to requests. The method further includes making the common resource available to the first request, prior to making the common resource available to the second request.

Other embodiments of the present invention include, without limitation, a subsystem comprising a streaming multiprocessor (SM) configured to implement one or more aspects of the disclosed methods as well as a computing device configured to implement one or more aspects of the disclosed methods.

One advantage of the disclosed technique is that older common resource access requests are not repeatedly blocked from making forward progress by newer access requests. Priority inversions are avoided by allocating the common resource to an existing older access request in preference to the new access request.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
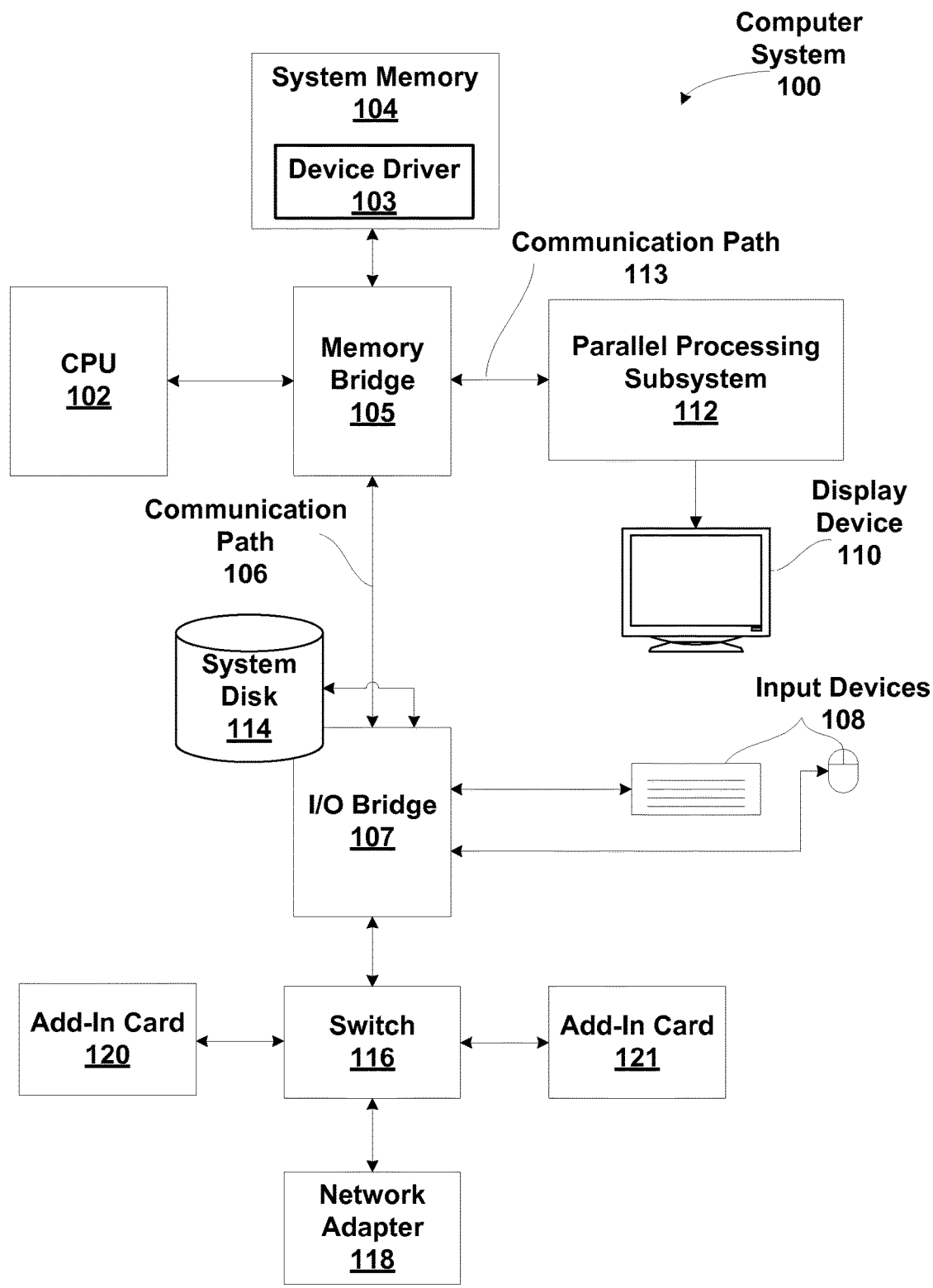
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 (e.g., a conventional cathode ray tube or liquid crystal display based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. The various communication paths shown in FIG. 1, including the specifically named communication paths 106 and 113, may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
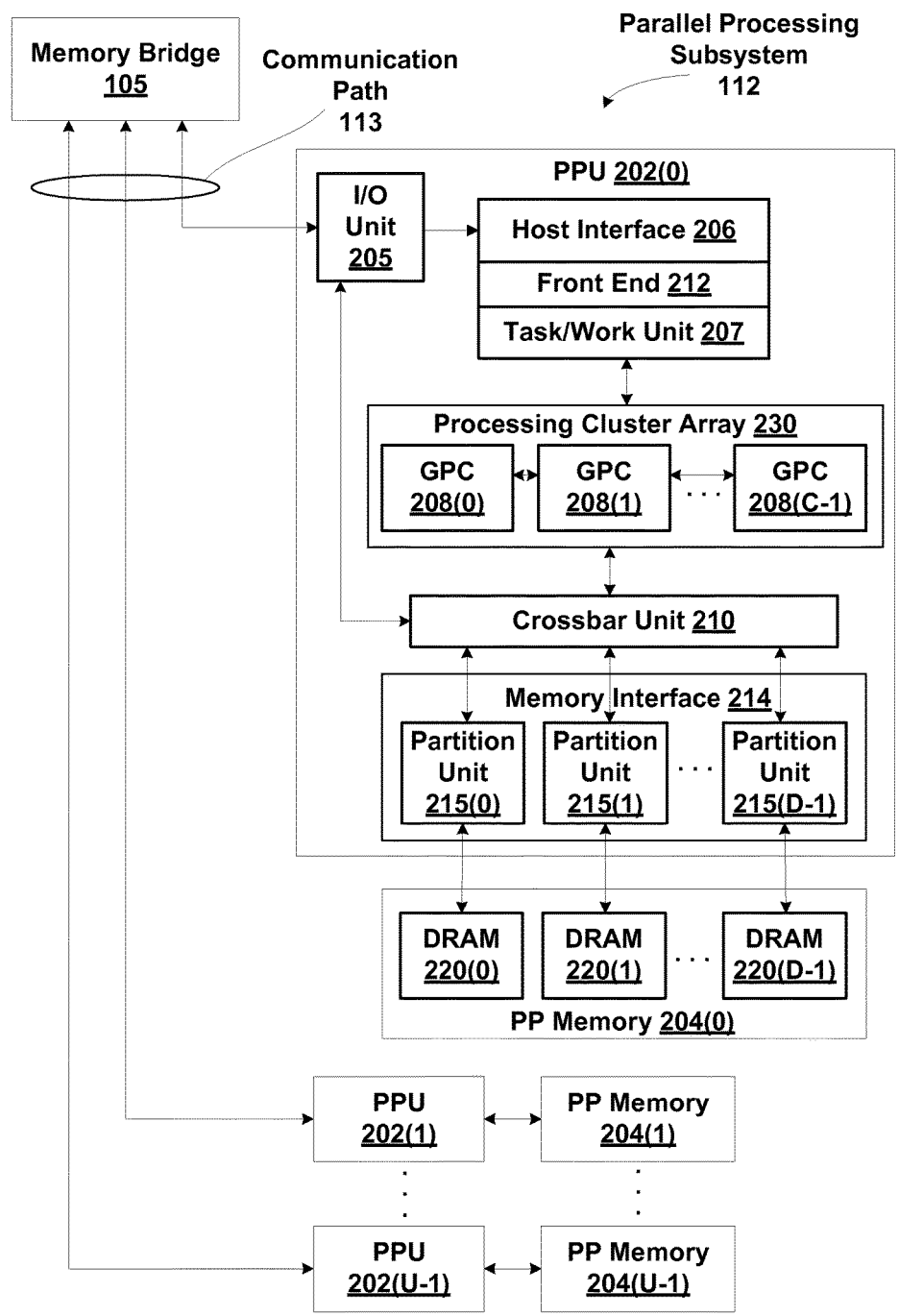
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C 1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3A:
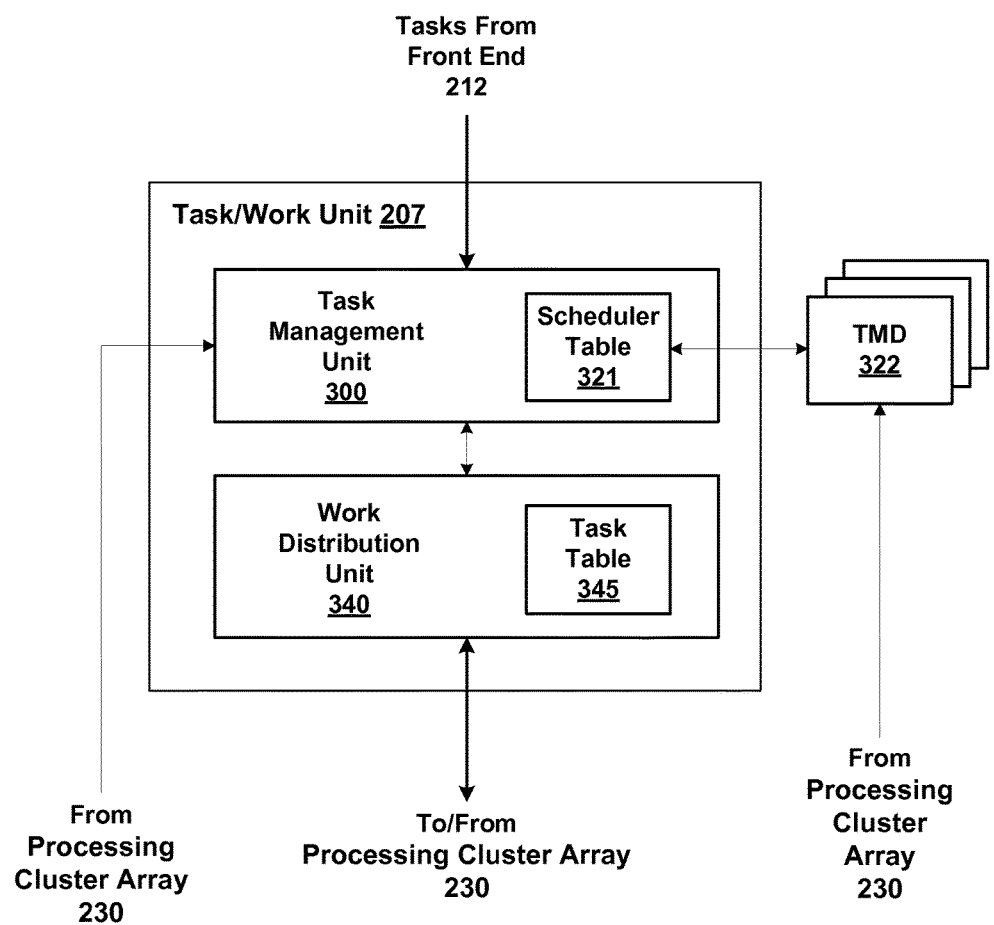
FIG. 3A is a block diagram of the front end of FIG. 2, according to one embodiment of the present invention.

FIG. 3A is a block diagram of the task/work unit 207 of FIG. 2, according to one embodiment of the present invention. The task/work unit 207 includes a task management unit 300 and the work distribution unit 340. The task management unit 300 organizes tasks to be scheduled based on execution priority levels. For each priority level, the task management unit 300 stores a list of pointers to the TMDs 322 corresponding to the tasks in the scheduler table 321, where the list may be implemented as a linked list. The TMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution. Therefore, the task management unit 300 may collect several tasks before scheduling the tasks. The collected tasks may then be scheduled based on priority information or using other techniques, such as round-robin scheduling.

The work distribution unit 340 includes a task table 345 with slots that may each be occupied by the TMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution of the task is not complete, then a pointer to the task is added to a list of task pointers to be scheduled so that execution of the task resumes at a later time. When a child processing task is generated, during execution of a task, a pointer to the child task is added to the list of task pointers to be scheduled. A child task may be generated by a TMD 322 executing in the processing cluster array 230.

Unlike a task that is received by the task/work unit 207 from the front end 212, child tasks are received from the processing cluster array 230. Child tasks are not inserted into pushbuffers or transmitted to the front end. The CPU 102 is not notified when a child task is generated or data for the child task is stored in memory. Another difference between the tasks that are provided through pushbuffers and child tasks is that the tasks provided through the pushbuffers are defined by the application program whereas the child tasks are dynamically generated during execution of the tasks.

Task Processing Overview

Figure 3B:
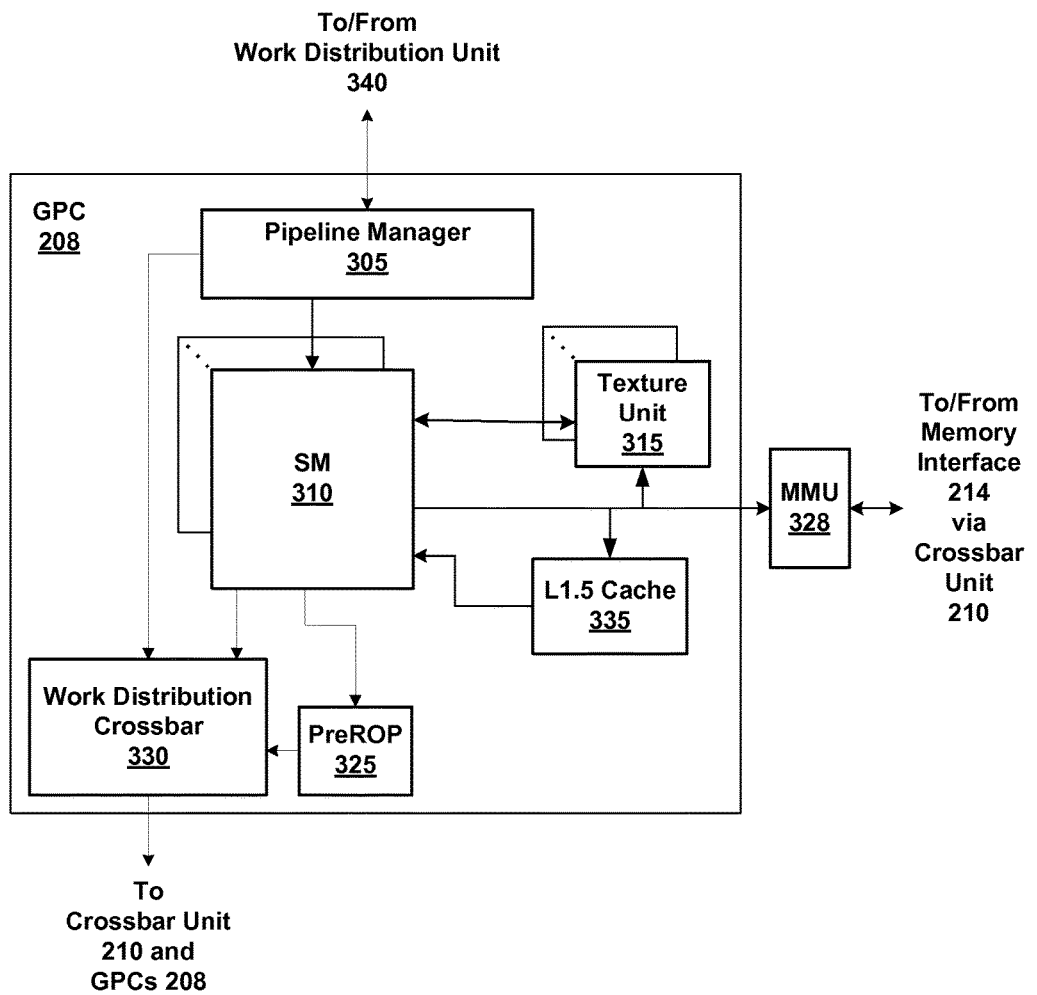
FIG. 3B is a block diagram of a general processing cluster within one of the parallel processing units of FIG. 2, according to one embodiment of the present invention.

FIG. 3B is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≥1, each SM 310 configured to process one or more thread groups. Also, each SM 310 advantageously includes an identical set of functional execution units (e.g., execution units and load-store units—shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines are idle during cycles when that thread group is being processed. A thread group may also include more threads than the number of processing engines within the SM 310, in which case processing takes place over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

Each SM 310 includes a level one (L1) cache (shown in FIG. 3C) or uses space in a corresponding L1 cache outside of the SM 310 that is used to perform load and store operations. Each SM 310 also has access to level two (L2) caches that are shared among all GPCs 208 and may be used to transfer data between threads. Finally, SMs 310 also have access to off-chip "global" memory, which can include, e.g., parallel processing memory 204 and/or system memory 104. It is to be understood that any memory external to PPU 202 may be used as global memory. Additionally, a level one-point-five (L1.5) cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SM 310 or the L1 cache or GPC 208. The physical address is processed to distribute surface data access locality to allow efficient request interleaving among partition units 215. The cache line index may be used to determine whether or not a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 310 and is fetched from an L2 cache that is shared between all GPCs 208, parallel processing memory 204, or system memory 104, as needed. Each SM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
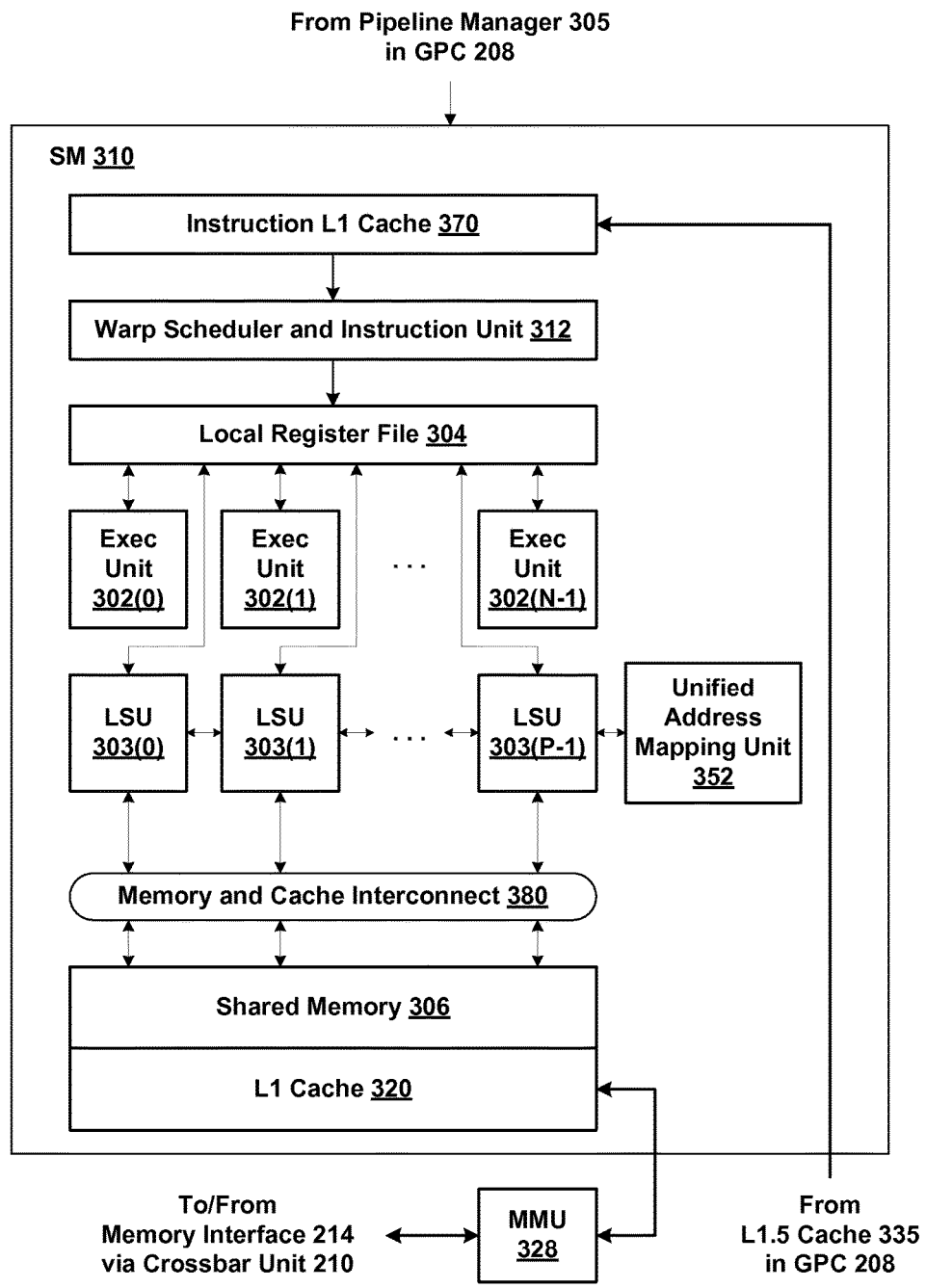
FIG. 3C is a block diagram of a portion of the streaming multiprocessor of FIG. 3B, according to one embodiment of the present invention.

FIG. 3C is a block diagram of the SM 310 of FIG. 3B, according to one embodiment of the present invention. The SM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by a TMD 322 (or by all LSUs 303) that store a CTA identifier, the CTA dimensions, the dimensions of a grid to which the CTA belongs (or queue position if the TMD 322 encodes a queue task instead of a grid task), and an identifier of the TMD 322 to which the CTA is assigned.

If the TMD 322 is a grid TMD, execution of the TMD 322 causes a fixed number of CTAs to be launched and executed to process the fixed amount of data stored in the queue 525. The number of CTAS is specified as the product of the grid width, height, and depth. The fixed amount of data may be stored in the TMD 322 or the TMD 322 may store a pointer to the data to be processed by the CTAs. The TMD 322 also stores a starting address of the program that is executed by the CTAs.

If the TMD 322 is a queue TMD, then a queue feature of the TMD 322 is used, meaning that the amount of data to be processed is not necessarily fixed. Queue entries store data for processing by the CTAs assigned to the TMD 322. The queue entries may also represent a child task that is generated by another TMD 322 during execution of a thread, thereby providing nested parallelism. Typically, execution of the thread, or CTA that includes the thread, is suspended until execution of the child task completes. The queue may be stored in the TMD 322 or separately from the TMD 322, in which case the TMD 322 stores a queue pointer to the queue. Advantageously, data generated by the child task may be written to the queue while the TMD 322 representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD 322 for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

Total Order Queue that Maintains Fairness and Order

Figure 4:
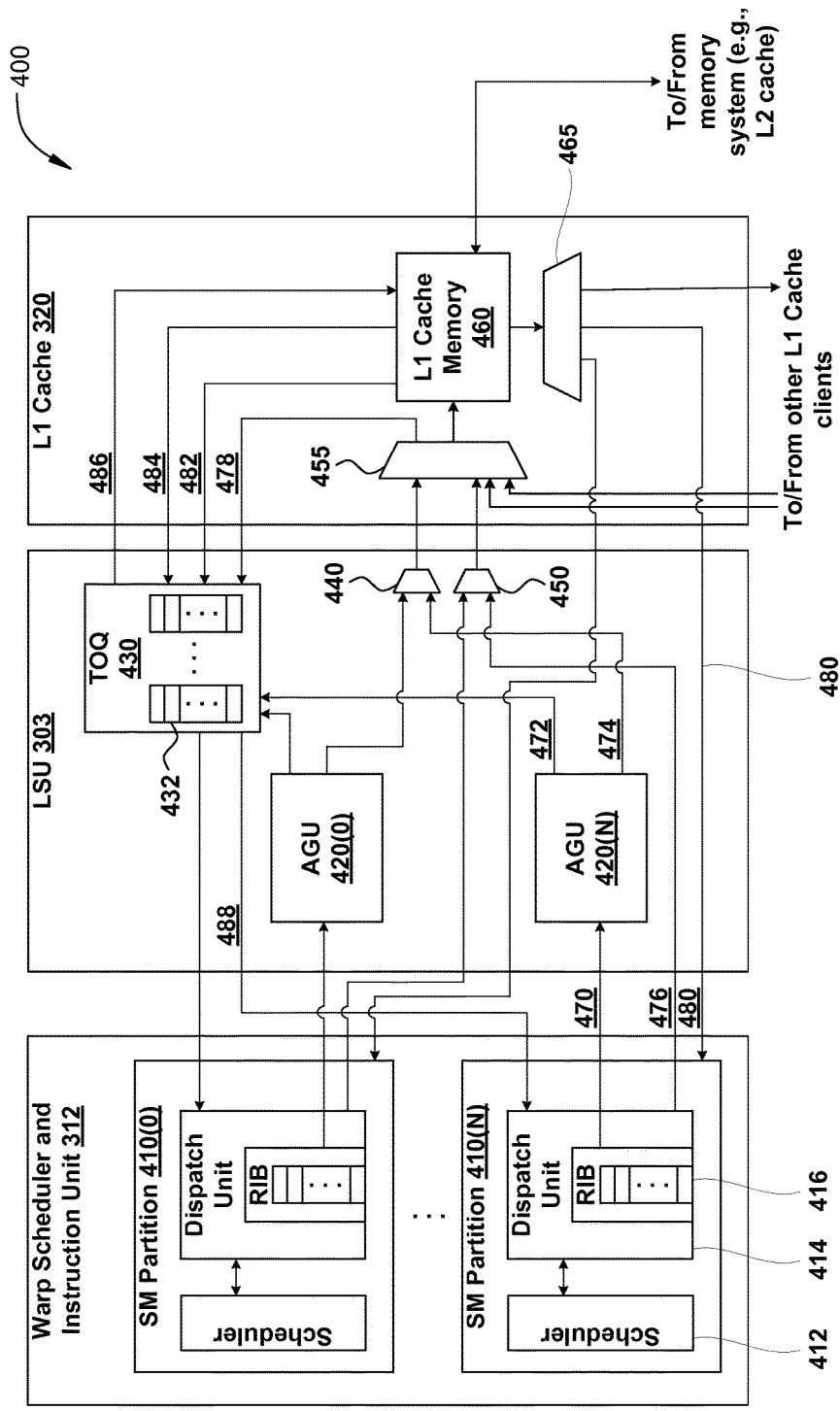
FIG. 4 illustrates a subsystem within the SM of FIG. 3C configured to service pending common resource access operations, according to one embodiment of the present invention.

FIG. 4 illustrates a subsystem 400 within the SM 310 of FIG. 3C configured to service pending common resource access operations, according to one embodiment of the present invention. As shown, the subsystem 400 includes SM partitions 410, address generation units (AGUs) 420, an address multiplexer 440, a write data multiplexer 450, an arbitration unit 455, an L1 cache memory 460, a read data demultiplexer 465, and a total order queue (TOQ) 430.

The SM partitions are located within the warp scheduler and instruction unit 312 of the SM 310. The SM partitions schedule and dispatch common resource access requests to the LSUs 303. As shown, the SM partitions 410 include a scheduler 412, a dispatch unit 414, and a replay instruction buffer (RIB) 416. The scheduler 412 receives new instructions from the instruction L1 cache 370 and schedules the instructions for execution by the SM 310. The scheduler 412 submits scheduled instructions to the dispatch unit 414.

The dispatch unit 414 receives schedule instructions from the scheduler 412, and forwards the instructions to the appropriate functional unit within the SM 310 for execution. Where an instruction includes a common resource access request, such as a request to load or store data in memory, the dispatch unit forwards the instruction to an LSU 303. Before dispatching such an instruction to the LSU 303, the dispatch unit determines whether there is an available entry in the RIB 416 to allocate to the instruction. An RIB entry is created for any common resource access request that may need at least one replay operation during the execution of the request. If there is an available RIB entry, then the dispatch unit stores information related to the instruction in the RIB 416 and dispatches the instruction to the LSU 303. If there is no available RIB entry, then the dispatch unit 414 stalls the stream of pending instructions directed to the LSU 303 until a RIB entry becomes available. In such a case, replay operations for dispatched instructions are still allowed to execute to completion. Once an instruction has completed execution, the corresponding RIB entry is retired, and the retired RIB entry is available to the dispatch unit 414 to allocate to a new instruction. As further described below, the dispatch unit 414 receives replay operation requests and requests to retire RIB entries from the TOQ 430. In addition, the dispatch unit 414 sends write data to the write data multiplexer 450, and receives read data from the read data demultiplexer 465.

The RIB 416 stores information regarding instructions that include a common resource access request. Such a request may require one or more replay operations in order to complete execution. A common resource access request may be able to complete in one execution cycle of the LSU 303. However, under some conditions, the access request may not be able to complete execution, and one or more additional execution cycles, called replay operations, are created in order for the access request to complete. These conditions include, without limitation, access requests spanning more cache lines than be simultaneously access by the LSU 303, accesses to more locations within a structure than can be simultaneously serviced by the structure, accesses to a structure that is currently consumed by prior requests, or access request that are lower in priority than another pending request. Information related to each such access request is stored in an associated RIB entry. The RIB entry is retrieved during subsequent replay operations and delivered to the LSU 303 to facilitate execution of the replay operation. The RIB entry may include, without limitation, the instruction, constant values needed by the operation, and the contents of registers needed by the operation. It should be recognized that the optimal number of available RIB entries may be based on a number of factors, including, without limitation, the frequency of occurrence of conditions requiring a replay operation, the average number of replay operations created for an access request, and latency within the dispatch unit 414. The RIB 416 sends commands and address locations to the AGU 420.

The AGUs 420, located within the LSU 303. Each AGU 420 is associated with a corresponding SM partition 410. For example, AGU 420(0) is associated with SM partitions 410(0), and AGU 420(N) is associated with SM partitions 410(N). The AGU 420 receives commands and addresses along signal path 470 from the RIB 416. In response, the AGU 420 sends AGU request status to the TOQ 430 along signal path 472. In turn, the TOQ 430 reads the AGU request status in order to determine whether additional replay operations are needed for the current access request or whether the RIB entry corresponding to the current access request may be retired. In addition, the AGU 420 sends address information to the address multiplexer 440 along signal path 474.

The address multiplexer 440 selects an address from the AGU 420 corresponding to the current access request and sends the selected address to the L1 cache 320. Each AGU 420 generates an address for the current access request, as described above. The address multiplexer 440 receives an address from each of the AGUs 420 along signal path 474. The address multiplexer 440 also receives a control signal (not shown) identifying which AGU 420 is selected for the current access request. If the control signal identifies AGU 420(0), then the address multiplexer 440 sends the address generated by AGU 420(0) to the L1 cache 320. If the control signal identifies AGU 420(N), then the address multiplexer 440 sends the address generated by AGU 420(N) to the L1 cache 320.

When the common resource access request is a request to store data to the common resource, the write data multiplexer 450 selects write data from the dispatch unit 414 corresponding to the current access request and sends the selected write data to the L1 cache 320. Each dispatch unit within the SM partitions 410 generates write data for the current access request, when the current access request is a store operation. The write data multiplexer 450 receives write data from each of the dispatch units 414 along signal path 476. The write data multiplexer 450 also receives a control signal (not shown) identifying which SM partition 410 is selected for the current store access request. If the control signal identifies SM partition 410(0), then the write data multiplexer 450 sends the write data generated by SM partition 410(0) to the L1 cache 320. If the control signal identifies SM partition 410(N), then the write data multiplexer 450 sends the write data generated by SM partition 410(N) to the L1 cache 320.

The arbitration unit 455 receives common resource access requests from SM partitions 410 and other clients and sends a selected access request to the common resource, such as the L1 cache memory 460, for servicing. The arbitration receives the address selected by the address multiplexer 440 as well as addresses from other clients requesting access to the common resource. The arbitration unit 455 routes the address associated with the selected access request to the L1 cache memory 460. Likewise, for access requests to store data in memory, the arbitration unit 455 routes the write data associated with the selected access request to the L1 cache memory 460. In addition, the arbitration unit 455 sends arbitration status information to the TOQ 430 along signal path 478.

The L1 cache memory 460, located within the L1 cache 320, is exemplary of a common resource accessible to SM partitions 410 and other external clients. The L1 cache memory 460 includes memory locations accessible to common resource access requests in order to store or load data. The L1 cache memory 460 receives addresses and control signals from the arbitration unit 455. The L1 cache memory 460 receives write data associated with store access requests from the arbitration unit 455, and sends read data associated with load access requests to the read data demultiplexer 465. As further described below, the L1 cache memory 460 sends status associated with L1 cache requests to the TOQ 430 along signal path 482 and resource status along path 484. The L1 cache memory 460 receives reservation counts from the TOQ 430 along signal path 486.

When the common resource access request is a request to load data from the common resource, the read data multiplexer 465 sends read data from the L1 cache memory 460 to the client requesting the load access request. The requesting unit may be an SM partition 410 or another L1 cache client. The read data multiplexer 465 receives a control signal (not shown) identifying which SM partition 410 is selected for the current load access request. If the control signal identifies SM partition 410(0), then the read data multiplexer 465 sends the read data generated by the L1 cache memory 460 to SM partition 410(0). If the control signal identifies SM partition 410(N), then the read data multiplexer 465 sends the read data generated by the L1 cache memory 460 to SM partition 410(N) along signal path 480.

Figure 9:
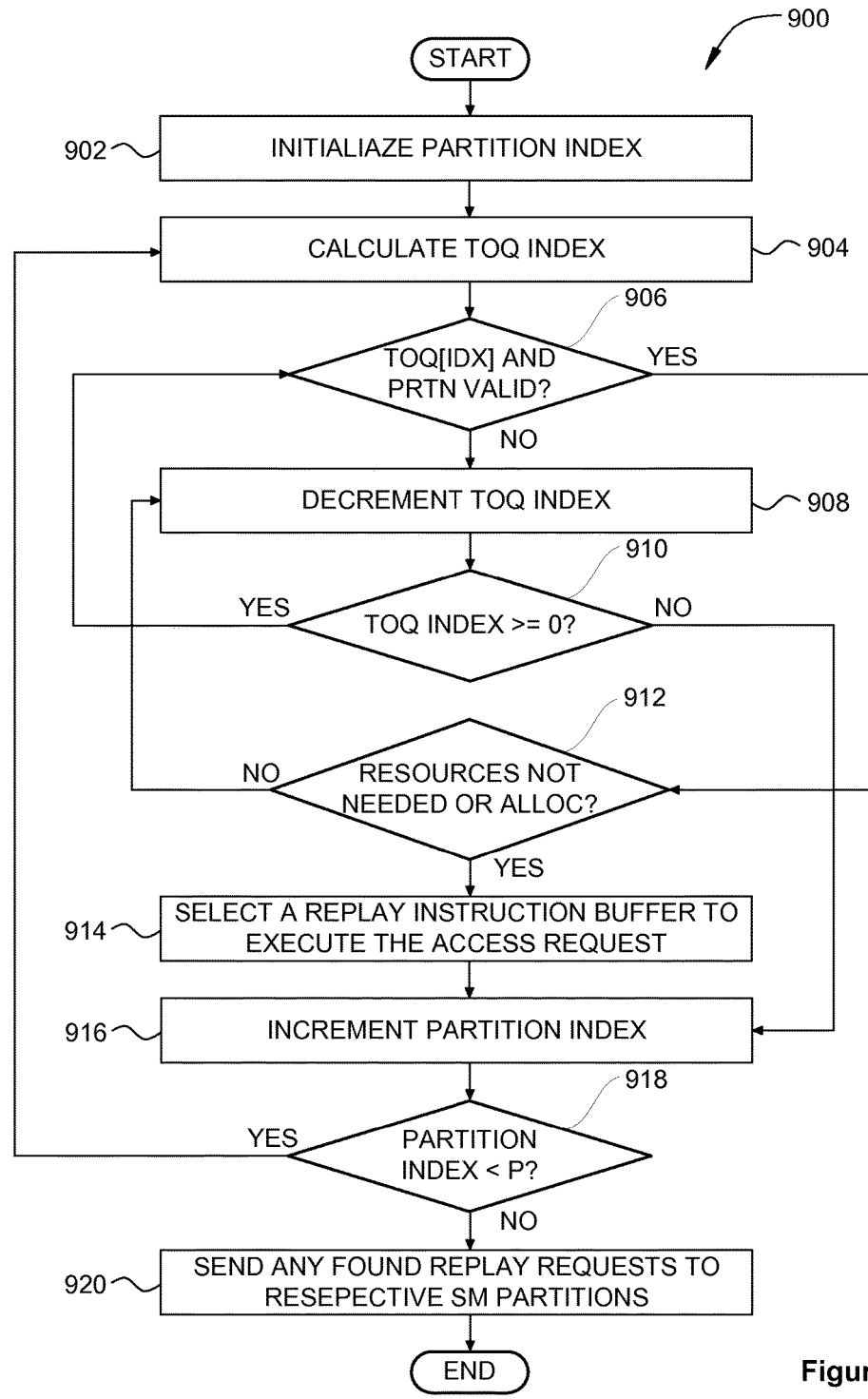
FIG. 9 is a flow diagram of method steps for selecting a common resource access request in a total order queue (TOQ) for servicing, according to one embodiment of the present invention.

As further described in conjunction with FIG. 9, the TOQ 430 is configured to select a replay operation for execution based on the oldest access request that is not blocked waiting for a common resource, in a manner that is fair and avoids priority inversion. As shown, the TOQ 430 includes a TOQ entry buffer 432, configured to store TOQ entries corresponding to each RIB entry within the SM partitions 410. As further described in conjunction with FIGS. 6A-6B, the TOQ 430 creates a TOQ entry within the TOQ entry buffer 432 when a new access request is received and retires the TOQ entry on completion of the access request. The size of the TOQ entry buffer 432 is based on the number of SM partitions 410 and the number of RIB entries in each RIB 416. For example, where an SM 310 includes 'P' SM partitions 410, and each SM partition 410 includes a RIB 416 comprising 'B' RIB entries, the TOQ entry buffer 432 could include P×B RIB entries. As such, each TOQ entry is paired with a corresponding entry in a RIB 416.

Each TOQ entry within the TOQ entry buffer 432 includes multiple fields, including, without limitation, the age of the associated access request, the identity of the SM partition 410 or other client that initiated the access request, the identity of the RIB that includes the replay operation information, the common resources associated with the access request and the status of the resources, wake-up conditions associated with the access request. The age of an access request may be explicitly recorded using well-known techniques such as via a priority scheme, least-recently-used, or least-recently-allocated approaches. As further described in conjunction with FIG. 10, age may be implied by arrival time and position of the common resource access request within a storage queue such as the TOQ entry buffer 432, as described in conjunction with FIGS. 4-5. Alternatively, age may be implied by arrival time and position of a replay operation associated with the common resource access request within a storage queue such as the TOQ entry buffer 432.

The status of a common resource may be described with respect to the access request associated with the TOQ entry. As further described in conjunction with FIG. 8, a common resource may be allocated to an access request by updating the status of the common resource as recorded in the corresponding TOQ entry. For example, the status of a common resource may indicate that the common resource is not needed by the access request. In another example, the common resource may be needed by the access request, but has already been allocated to the access request. In another example, the common resource may be needed by the access request, but has not yet been allocated to the access request. In another example, the common resource may be divided into portions, such as cache lines, where a set, represented as a group of one or more cache lines, or a way, represented as a particular cache line within a given set, is currently in use. In yet another example, the resource may be locked and the set or way are in use. As further described in conjunction with FIG. 7, the common resource status fields of the TOQ entries may be routinely updated as the status conditions of the common resources change.

Where needed resources are not yet allocated, locked, or in use, the TOQ 430 determines whether the resource shortage is a short term or transitory condition versus a long term condition. Access requests with short-term or transitory resource conflicts may be eligible for immediate execution or execution after a finite delay. Access requests with a long term or indeterminate resource shortage may be placed into a sleep state. As further described in conjunction with FIG. 11, the TOQ 430 may wake up sleeping access requests on the occurrence of certain wake-up conditions. The TOQ entry corresponding to an access request in a sleep state may specify one or more of these wake-up conditions, such as: the resource is available for allocation, the resource has been unlocked, or the needed set or way of a cache-type resource is no longer in use.

TOQ entries that are sleeping are waiting for one or more wake-up conditions. Upon the occurrence of a wake-up condition, the TOQ 430 may select a single sleeping TOQ entry for wake-up or may broadcast a wake-up operation to multiple sleeping entries. For example, where the resource is a first-in first-out memory (FIFO) that is configured to deliver one data value at a time, the TOQ 430 could wake up a single TOQ entry that is waiting for the FIFO to be available. In another example, the TOQ 430 could broadcast a wake-up operation to multiple TOQ entries waiting for the same cache line to be filled with data. In such a case, the cache line is a resource than can satisfy all TOQ entries put to sleep while waiting for the cache line to be available. In some cases, a TOQ entry may exist for which no wake-up conditions are needed. Such a TOQ entry is eligible to be chosen for replay operation immediately, and is appropriate if the condition causing the common resource conflict is of a transitory or short term nature.

In one embodiment, during each execution cycle, the TOQ 430 selects the oldest eligible access request for one or more replay operations. An eligible access request is one that has been allocated all needed resources and has satisfied all wake-up conditions. Access requests in the sleep state are not eligible for selection. The TOQ 430 requests replay operations for an eligible TOQ entry based on the total replay operation beats discovered for that entry, the number of requested prescheduled replay operations, and the number of requested on-demand replay operations. A beat comprises one or more replay operations associated with a particular common resource access request.

When a common resource access request is originally dispatched for execution, and assuming the request is not pre-empted by the SM 310 or the arbitration unit 455, the replay operation counter (not shown) is set to zero, and the total beats discovered counter (not shown) is initialized according to the request status received from the AGUs 420 and the L1 cache memory 460. If the access request includes pre-scheduled replay operations, then the TOQ 430 accumulates beats associated with the pre-scheduled replay operations. The TOQ 430 then accumulates beats associated with on-demand replay operations, if the access request did not complete as a result of the pre-scheduled replay operations.

It should be recognized that the TOQ 430 may be susceptible to deadlock or livelock conditions. A deadlock occurs, for example, if each of two access requests requires two common resources, each access request is allocated one of the two resources, and each access request is placed in a sleep condition waiting for the other resource to become available. In such a case, neither access request would be able to acquire the additional resource, and the access requests could perpetually remain in a sleep state. In another example, a sleeping access request could be placed in an awake state when a needed resource becomes available, and the resource could be assigned to a second access request. However, the second access request could be waiting for another resource, and therefore would be placed back into a sleep state. Other access requests awaiting the common resource could likewise be placed in an awake state, be allocated a port associated with the common resource, and placed back into a sleep state. This process could continue until all ports of the common resource are consumed by sleeping requests, and the common resource is not available to any active access requests.

Deadlock conditions may be particularly pronounced when one or more access requests need the same common resource, and all access ports to the common resource have been allocated to other requests. Such a common resource may be called a scarce resource. In one embodiment, the TOQ 430 may have a mechanism to manage resources when they are in scarce supply. When a common resource is deemed to be a scarce resource, priority access to the scarce resource may be given to existing older TOQ entries and any associated prescheduled replay operations rather than younger TOQ entries associated with recently dispatched access requests. In at least one embodiment, a common resource may be considered to be a scarce resource if at least one access request is currently in a sleep state waiting for the resource to become available. Examples of resources that may become scarce include, without limitation, a first-in-first-out (FIFO) memory, a specific set and way in a cache-type memory, or any way in a particular set of a cache-type memory. The TOQ 430 may not send broadcast wake-up operations once a common resource is determined to be a scarce resource. When a resource is considered to be scarce, the TOQ 430 may assign the resource to an individual access request using a single wake-up operation, rather than a broadcast wake-up operation. The TOQ 430 may use the age of the TOQ entry, where the age may be the position of the TOQ entry within the TOQ entry buffer 432, to allocate the scarce resource to a sleeping TOQ entry. Once the assigned access request completes execution, the scarce resource may become available, and may be assigned to another access request. Once a common resource is no longer considered to be scarce, that is, no sleeping access requests are waiting for the resource, the TOQ 430 may resume sending broadcast wake-up operations associated with the resource.

Under certain conditions, deadlock conditions may be resolved by allowing a common resource needed by an older TOQ entry, and currently allocated to a younger TOQ entry, to be "stolen" from the younger TOQ entry. If both TOQ entries need multiple resources, then neither entry may be allocated all of the needed resources. In one example, the set of common resources needed by an access request may change over time as various conditions are evolve throughout the execution cycle of the access request. An older TOQ entry could require two resources, identified as A and B, where only B is allocated to the access request. The older TOQ entry would be placed into a sleep state waiting for resource A. While the older TOQ entry is in the sleep state, a younger TOQ entry could require common resources B and C, but only resource C is allocated. The younger resource could be placed in a sleep state awaiting resource B. Once awake, the older TOQ entry could discovers that the TOQ entry now requires resource C, currently allocated to the younger TOQ entry. Both the older TOQ entry and the younger TOQ are awaiting allocation of a common resource allocated to the other TOQ entry. One approach to resolve this type of deadlock condition is to allow the older TOQ entry to "steal" the needed common resources from a younger TOQ entry.

In one embodiment, the TOQ 430 may employ virtual stealing, where the older TOQ entry may be selected for one or more replay operations even though not all needed resources have been allocated. During execution of the replay operations, the associated access request may consume resources reserved for younger entries. The resource reservations may not be bound to the younger TOQ entries, so the older entry may be able to gather all of the needed resources to make forward progress. Once the older TOQ entry makes forward progress, the associated access request may free up needed resources, thereby allowing the common resources to be allocated to younger TOQ entries.

In another embodiment, the TOQ 430 may employ physical stealing, where a specific resource may be stolen from a specific TOQ entry and allocated to an older TOQ entry requiring that resource. In such a case, the status of resources needed by the younger TOQ entry or entries may be modified from an allocated status to a non-allocated status, and the status of the resources may be transitioned to an allocated state for the older TOQ entry. Once the older TOQ entry makes sufficient progress, the associated request frees up the allocated resources, thereby allowing younger TOQ entries to acquire the needed resources.

In various embodiments, resource stealing may be triggered immediately upon discovering a resource conflict, or resource stealing may be delayed for a fixed or variable period of time after the conflict is discovered. Resource stealing may be restricted to the oldest TOQ entry, where the oldest TOQ entry steals all needed, unallocated resources. In such a case, all other access requests that could potentially consume resources needed by the oldest TOQ entry are deferred until at least some forward progress is made on the oldest TOQ entry.

Various configurations of common resources may be contemplated within the scope of the present invention. In one embodiment, some access requests managed by the TOQ 430 may have multiple processing phases, where the resources that are likely to be needed by each phase can vary. In one example, an access request includes threads that could belong to different address spaces, where one address space could be satisfied by a cache level portion of a more general memory hierarchy, and another address space could be satisfied by a self-contained local memory not included in the general memory hierarchy. In another embodiment, an access request may select a sequence of operands in adjacent memory locations, where a different sequence of operands could be accessed for each thread.

Figure 5:
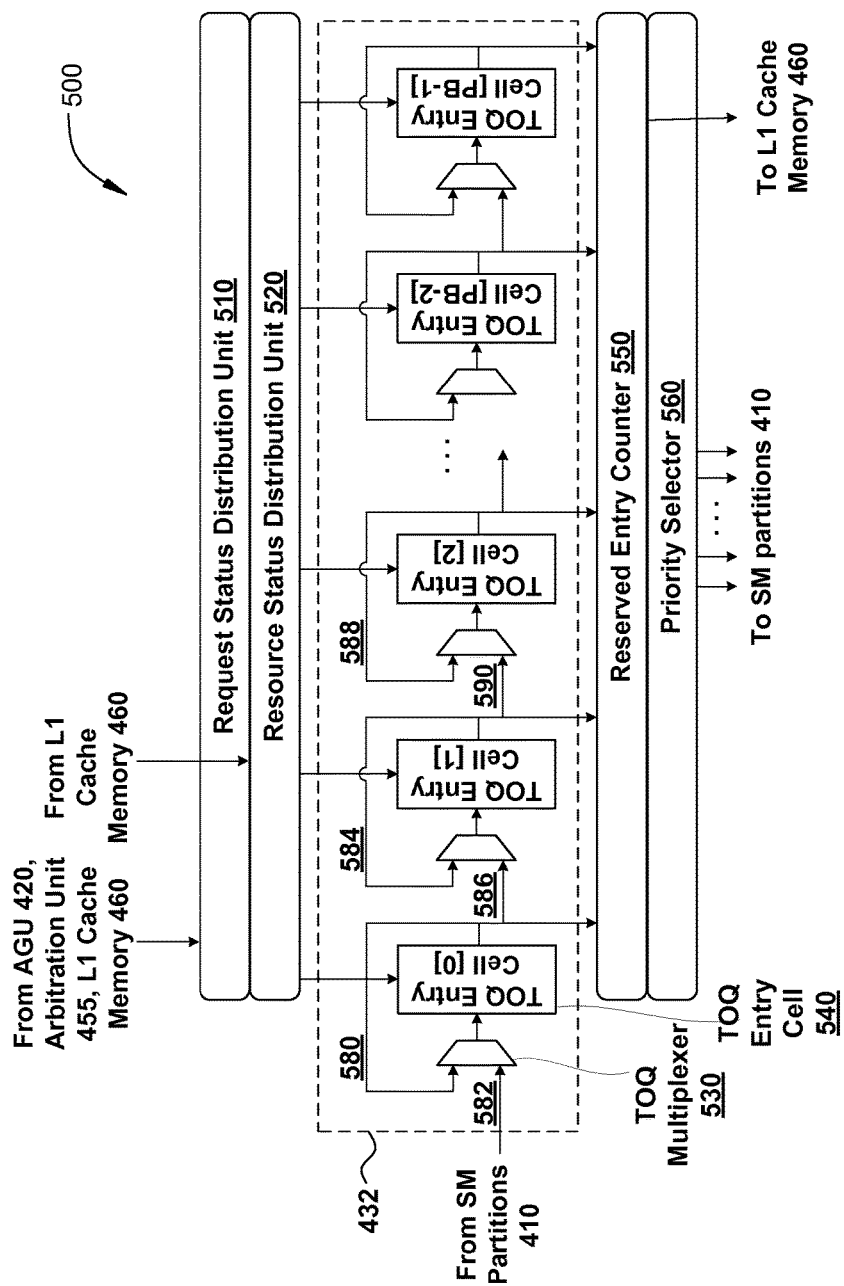
FIG. 5 illustrates a TOQ entry aging unit within the TOQ of FIG. 4, according to one embodiment of the present invention.

FIG. 5 illustrates a TOQ entry aging unit 500 within the TOQ 430 of FIG. 4, according to one embodiment of the present invention. As shown, the TOQ entry aging unit 500 includes a request status distribution unit 510, a resource status distribution unit 520, a TOQ entry buffer 432, a reserved entry counter 550, and a priority selector 560.

The request status distribution unit 510 distributes status regarding common resource access requests to the TOQ entry buffer 432. The request status distribution unit 510 receives address generation unit request status from the AGU 420 along signal path 472, arbitration status from the arbitration unit 455 along signal path 478, and L1 cache request status from the L1 cache memory 460 along signal path 482. The request status distribution unit 510 then sends the request status information from these three units to each TOQ entry cell 540 in the TOQ entry buffer 432. The status information, in turn, is stored in an appropriate location within each TOQ entry cell 540.

The resource status distribution unit 520 distributes status regarding common resources to the TOQ entry buffer 432. The resource status distribution unit 520 receives L1 cache resource status from the L1 cache memory 460 along signal path 484. The resource status distribution unit 520 then sends the resource status information to each TOQ entry cell 540 in the TOQ entry buffer 432. The status information, in turn, is stored in an appropriate location within each TOQ entry cell 540.

The TOQ entry buffer 432 includes a TOQ entry cell 540 for every entry in the RIB 416 within each SM partition 410. The TOQ entry buffer 432 creates TOQ entries associated with new access requests received from SM partitions 410 on the left side of the figure. The TOQ entry buffer 432 shifts the TOQ entry cells 540 to the right as the TOQ entries age. As shown, the TOQ entry buffer 432 includes TOQ entry cells 540 and TOQ multiplexers 530.

TOQ multiplexers 530 select whether a TOQ entry cell 540 recirculates the current state of the TOQ entry buffer 432, or shifts TOQ entry cells 540 to the right as new access requests are received from the SM partitions 410. To recirculate TOQ entry cells 540, the TOQ multiplexers 530 select the recirculation path along signal paths exemplified by 580 584 588. To shift TOQ entry cells 540, the TOQ multiplexers 530 select the shift path along signal paths exemplified by 582 586 590.

The TOQ entry cells 540 are configured to store information related to common resource access requests received from SM partitions. The TOQ entry cells 540 are updated with changes to request status and resource status from the request status distribution unit 510 and the resource status distribution unit 520 respectively. Initially, the TOQ entry cells 540 and associated TOQ multiplexers 530 are configured to recirculate. The current state of TOQ entry cell [0] recirculates along signal path 580, the current state of TOQ entry cell [1] recirculates along signal path 584, and the current state of TOQ entry cell [2] recirculates along signal path 588. When a new access request is received from the SM partitions, TOQ entry cell [0] is configured to receive and store a TOQ entry associated with the new access request along signal path 582. If the current state of TOQ entry cell [0] indicates an invalid TOQ entry, then the remaining TOQ entry cells 540 recirculate. If, however, TOQ entry cell [0] is marked as a valid TOQ entry, then the TOQ entry is shifted to the next TOQ entry cell 540. In such a case, TOQ entry cell [1] receives the TOQ entry stored in TOQ entry cell [0] along signal path 586. If the current state of TOQ entry cell [1] indicates an invalid TOQ entry, then the remaining TOQ entry cells 540 recirculate. If, however, TOQ entry cell [1] is marked as a valid TOQ entry, then the TOQ entry is shifted to the next TOQ entry cell 540. In such a case, TOQ entry cell [2] receives the TOQ entry stored in TOQ entry cell [1] along signal path 590. The process continues until an invalid (empty) TOQ entry cell 540 is found.

The reserved entry counter 550 analyzes TOQ entry cells 540 marked as valid and determines a reservation count for each common resource needed by at least one valid TOQ entry. The reservation count for a given resource is equal to the number of TOQ entry cells 540 marked as valid that require the resource. The reserved entry counter 550 sends the reservation counts to each of the corresponding common resources, such as the L1 cache memory 460.

The priority selector 560 selects a TOQ entry, associated with a RIB 416 in a given SM partition 410, for servicing. Typically, the priority selector 560 selects the TOQ entry in the rightmost TOQ entry cell 540 that is both marked as valid and has reserved all needed resources to complete execution. Note that the selected TOQ entry may not necessarily be stored in the rightmost TOQ entry cell 540 marked as valid. Thus, empty TOQ entry cells 540, or holes, may appear within the middle of a group of valid TOQ entry cells 540. These holes may be filled as new access requests are received from the SM partitions 410. The priority selector 560 sends RIB read requests and requests to retire RIB entries to the SM partitions 410.

Note that alternative techniques may be employed to move blocks of TOQ entries rather than using a shift register approach as described above. In addition, static information associated with TOQ entries, such as fields not directly related to sleep and wake-up conditions, may be stored within the TOQ entry cells 540, or within a separate memory structure such as a static memory.

Figure 6A:
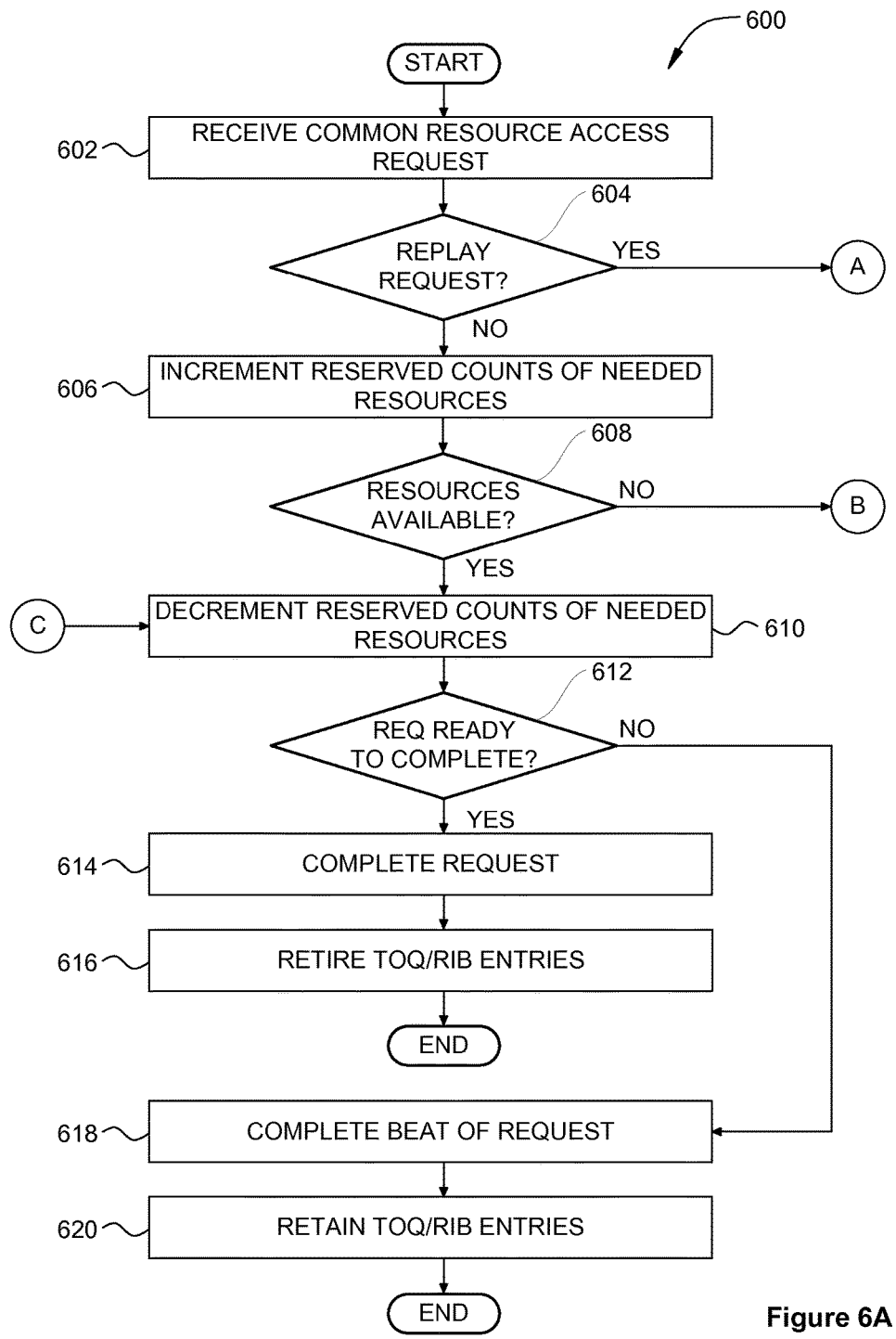
FIGS. 6A and 6B set forth a flow diagram of method steps for adding common resource access requests to a total order queue, according to one embodiment of the present invention.
Figure 6B:
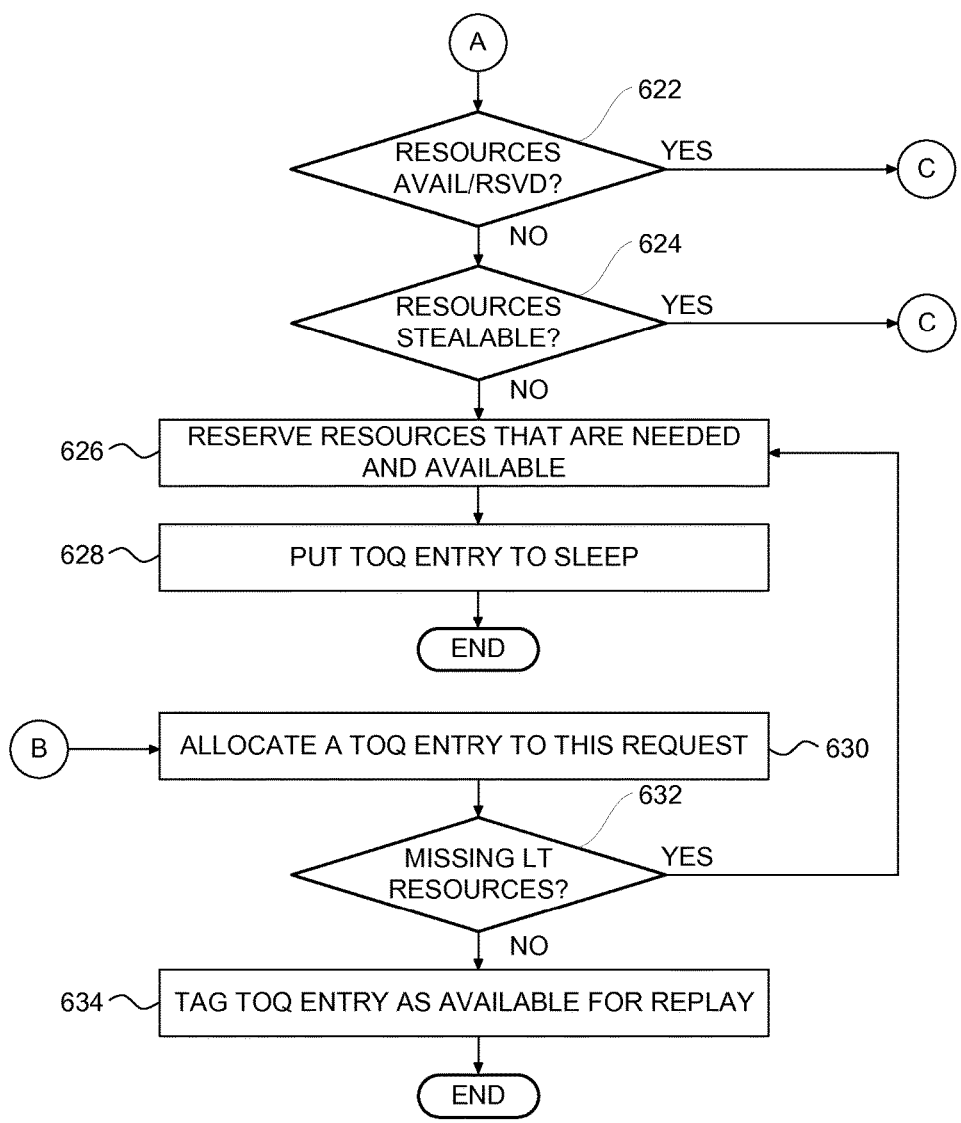

FIGS. 6A and 6B set forth a flow diagram of method steps for adding common resource access requests to a total order queue 430, according to one embodiment of the present invention. Although the method steps are described in conjunction with the systems of FIGS. 1-5, persons of ordinary skill in the art will understand that any system configured to perform the method steps, in any order, is within the scope of the present invention.

As shown, the method 600 begins at step 602, where the TOQ 430 receives an access request associated with a common resource. At step 604, the TOQ 430 determines whether the access request is a replay operation request. If the access request is not a replay operation request, then the access request is a new request, and the method 600 proceeds to step 606, where the TOQ 430 increments the reserved counts for each common resource needed by the access request. At step 608, the TOQ 430 determines whether the common resources needed by the access request are available for allocation to requests. If the common resources are available for allocation, then the method 600 proceeds to step 610, where the TOQ 430 decrements the reserved counts for each common resource needed by the access request.

At step 612, the TOQ 430 determines whether the access request is ready to complete. The access request is ready to complete if there is no remaining work in order to complete the request, and the request has been accepted by the L1 cache 320. If the access request is ready to complete, then the method 600 proceeds to step 614, where the TOQ 430 completes the request. The RIB entry corresponding to the TOQ entry is accessed to complete the request. The RIB entry includes execution information associated with the access request that is used for completing one or more replay operations. At step 616, the TOQ 430 retires the TOQ and RIB entries, if any, associated with the access request. The method 600 then terminates.

Returning now to step 604, if the access request is a replay operation request, then the method 600 proceeds to step 622, where the TOQ 430 determines whether the TOQ entry associated with the access request indicates that each needed common resource is either available or has previously been reserved. If each needed common resource is either available or has been reserved, then the method 600 returns to step 610, as described above. If, at step 622, at least one needed common resource is either unavailable or has not been reserved, then the method 600 proceeds to step 624, where the TOQ 430 determines whether the common resources that are not available or previously reserved can be stolen from another access request. If the common resources can be stolen, then the method 600 returns to step 610, as described above. If the common resources cannot stolen, then the method 600 proceeds to step 626, where the TOQ 430 reserves common resources that are needed by the access request and available. The TOQ 430 updates the TOQ entry with this information. At step 628, the TOQ 430 puts the TOQ entry to sleep. The method 600 then terminates.

Returning now to step 608, if one or more common resources needed by the access requires are not available for allocation, then the method 600 proceeds to step 630, where the TOQ 430 allocates a TOQ entry to this access request. In such a case, servicing of the access request is delayed. At step 632, the TOQ 430 determines whether the access request is missing any long-term resources. If the access request is missing any long-term resources, then the method 600 returns to step 626, as described above. If the access request is not missing any long-term resources, then the method 600 proceeds to step 634, where the TOQ 430 tags the TOQ entry associated with the access request as available for replay. The method 600 then terminates.

Returning now to step 612, if the access request is not able to complete, then the method 600 proceeds to step 618, where the TOQ 430 completes one beat of the access request. A beat comprises one or more replay operations associated with a particular common resource access request. The RIB entry corresponding to the TOQ entry is accessed to complete the request. The RIB entry includes execution information associated with the access request that is used for completing one or more replay operations included in the beat. At step 620, the TOQ 430 retains the TOQ and RIB entries, if any, associated with the access request. The method 600 then terminates.

Once a TOQ entry is created for an associated common resource access request, the TOQ 430 may update the TOQ entry as the status of common resources needed by the TOQ entry changes.

Figure 7:
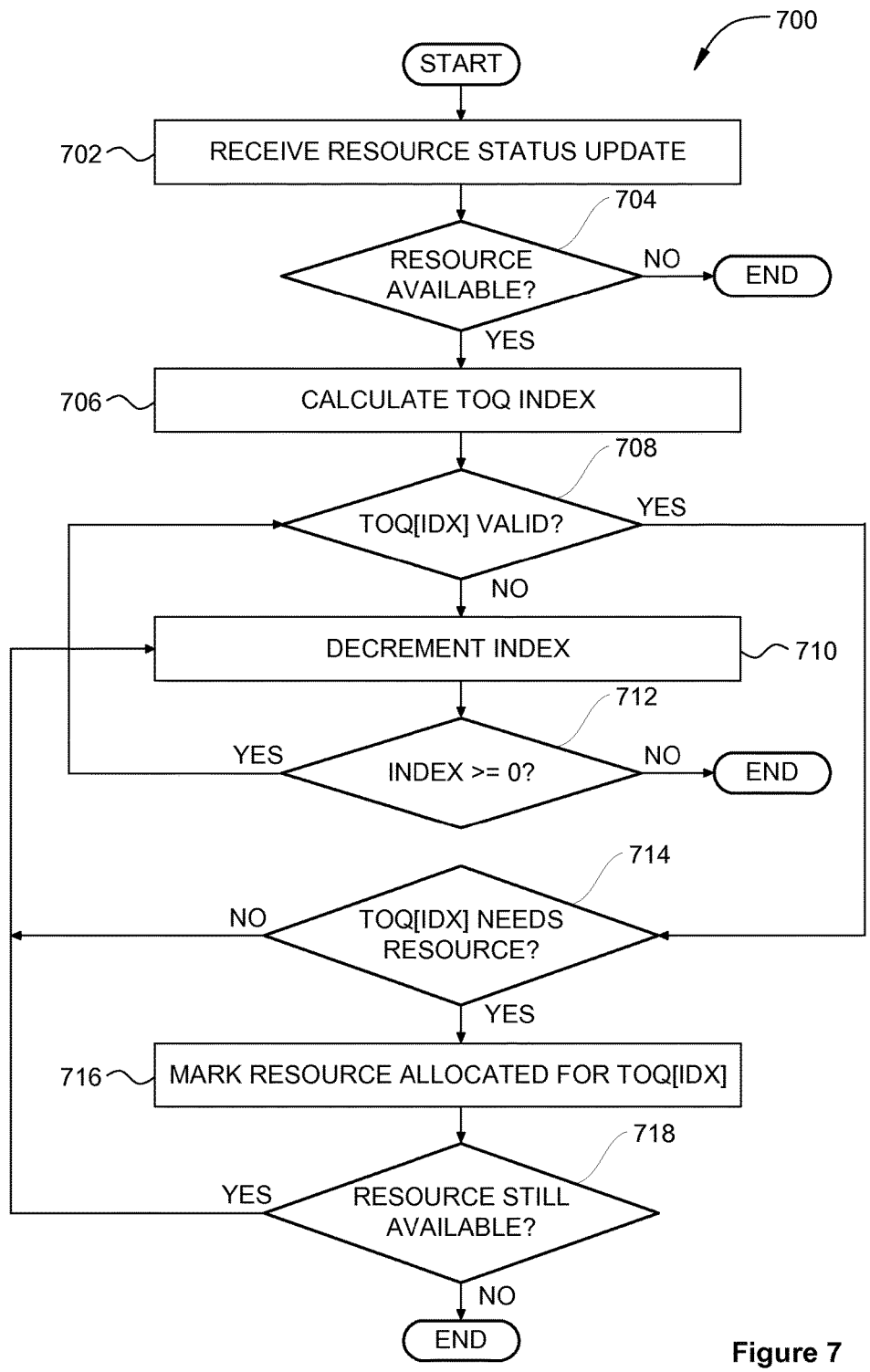
FIG. 7 is a flow diagram of method steps for updating the status of a common resource, according to one embodiment of the present invention.

FIG. 7 is a flow diagram of method steps for updating the status of a common resource, according to one embodiment of the present invention. Although the method steps are described in conjunction with the systems of FIGS. 1-5, persons of ordinary skill in the art will understand that any system configured to perform the method steps, in any order, is within the scope of the present invention.

As shown, the method 700 begins at step 702, where the TOQ 430 receives an updated status for a common resource needed by one or more TOQ entries. At step 704, the TOQ 430 determines whether the status update indicates that the common resource is available. If the common resource is not available, then the method 700 terminates.

If, however, the common resource is available the method 700 proceeds to step 706, where the TOQ 430 calculates the TOQ index for the highest numbered TOQ entry, where a higher numbered TOQ entry represents an older access request than a lower numbered TOQ entry. At step 708, the TOQ 430 determines whether the TOQ entry referenced by the index is a valid TOQ entry. The TOQ entry is invalid if the associated access request has completed and the TOQ entry has subsequently been retired. If the TOQ entry is not valid, then the method 700 proceeds to step 710, where the TOQ 430 decrements the index. At step 712, the TOQ 430 determines whether the index is greater than or equal to zero. If the index is not greater than or equal to zero, then the entire TOQ has been scanned, and the method 700 terminates.

If, at step 712, the index is greater than or equal to zero, then the method 700 returns to step 708, as described above. If, at step 708, the TOQ entry is valid, then the method 700 proceeds to step 714, where the TOQ 430 determines whether the TOQ entry referenced by the index requires the common resource whose status has changed. If the TOQ entry does not need the resource, then the method 700 returns to step 710, as described above. If, however, the TOQ entry does need the resource, then the method 700 proceeds to step 716, where the TOQ 430 marks the resource as allocated to the TOQ entry associated with the index. At step 718, the TOQ 430 determines whether the common resource is still available. If the common resource is still available, then the method 700 returns to step 710, as described above. In such a case, the common resource still is available after the prior allocation, and may still be allocated to additional TOQ entries. If the common resource is no longer available, then the method 700 terminates.

As described above in association with FIGS. 6A-6B, TOQ entries may be put to sleep pending availability of one or more needed common resources. Once the needed common resources become available, the TOQ 430 awakens the TOQ entry places the TOQ entry in an active state, so that the associated access request may continue execution.

Figure 8:
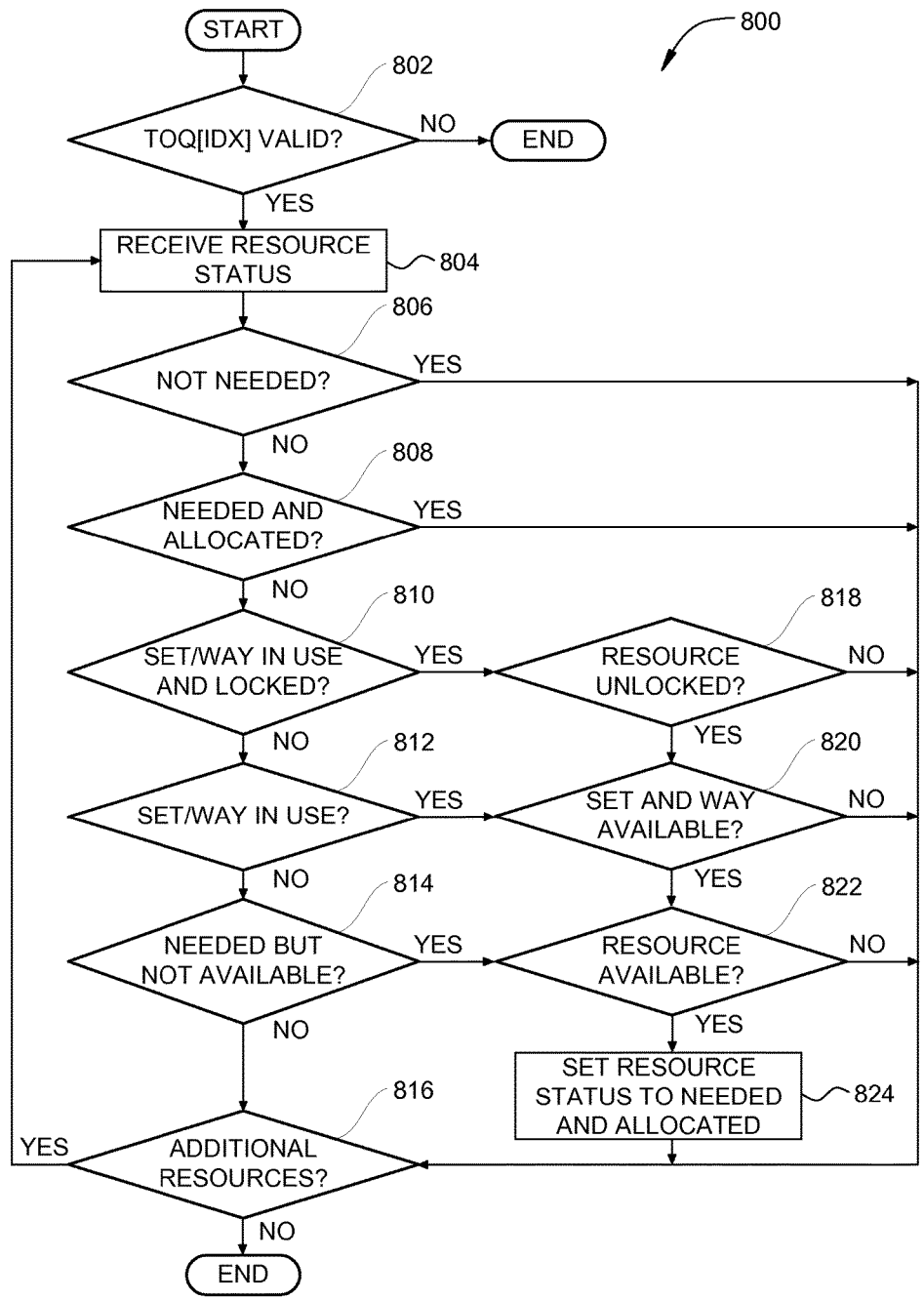
FIG. 8 is a flow diagram of method steps for allocating a common resource to a TOQ entry associated with a common resource access request, according to one embodiment of the present invention.

FIG. 8 is a flow diagram of method steps for allocating a common resource to a TOQ entry associated with a common resource access request, according to one embodiment of the present invention. Although the method steps are described in conjunction with the systems of FIGS. 1-5, persons of ordinary skill in the art will understand that any system configured to perform the method steps, in any order, is within the scope of the present invention.

As shown, the method 800 begins at step 802, where the TOQ 430 determines whether the TOQ entry associated with a specified index is a valid TOQ entry. The TOQ entry is invalid if the associated access request has completed and the TOQ entry has subsequently been retired. If the TOQ entry is not valid, then the method 800 terminates.

If the TOQ entry is valid, then the method 800 proceeds to step 804, where the TOQ 430 receives an updated status for a common resource needed by the TOQ entry. At step 806, the TOQ 430 determines whether the status of the common resource is equal to NOT NEEDED, where NOT NEEDED indicates that the common resource is not needed by the TOQ entry. In such a case, no change is needed to the TOQ entry. The method 800 proceeds to step 816, where the TOQ 430 determines whether the TOQ entry is waiting for additional resources. If the TOQ entry is not waiting for additional resources, then the method 800 terminates. If the TOQ entry is waiting for additional resources, then the method 800 returns to step 804, as described above.

Returning now to step 806, if the status of the common resource is not equal to NOT NEEDED, then the method 800 proceeds to step 808, where the TOQ 430 determines whether the status of the common resource is equal to NEEDED AND ALLOCATED. A status of NEEDED AND ALLOCATED indicates that the common resource is needed by the TOQ entry, and is already allocated to the TOQ entry. In such a case, no change is needed to the TOQ entry. The method 800 proceeds to step 816, as described above.

Returning now to step 808, if the status of the common resource is not equal to NEEDED AND ALLOCATED, then the method 800 proceeds to step 810, where the TOQ 430 determines whether the status of the common resource is equal to SET/WAY IN USE AND LOCKED. A status of SET/WAY IN USE AND LOCKED indicates that the TOQ entry was put to sleep because the common resource is needed by the TOQ entry, but the needed set or way of the common resource was in use, and the resource was locked. In such a case, the method 800 proceeds to step 818, where the TOQ 430 determines whether the resource is now unlocked. If the resource is not unlocked, then the method 800 proceeds to step 816, as described above. If the resource is unlocked, then the method 800 proceeds to step 820, where the TOQ 430 determines whether the set and way of the common resource is now available. If the set and way are not available, then the method 800 proceeds to step 816, as described above. If the set and way are available, then the method 800 proceeds to step 822, where the TOQ 430 determines whether the resource is available. If the resource is not available, then the method 800 proceeds to step 816, as described above. If the resource is available, then the method 800 proceeds to step 824, where the TOQ 430 sets the status of the resource to NEEDED AND ALLOCATED, indicating the common resource is now allocated to the TOQ entry referenced by the index. The method 800 then proceeds to step 816, as described above.

Returning now to step 810, if the status of the common resource is not equal to SET/WAY IN USE AND LOCKED, then the method 800 proceeds to step 812, where the TOQ 430 determines whether the status of the common resource is equal to SET/WAY IN USE. A status of SET/WAY IN USE indicates that the TOQ entry was put to sleep because the common resource is needed by the TOQ entry, but the needed set or way of the common resource was in use. In such a case, the method 800 proceeds to step 820, as described above, to determine whether the resource and the set and way are now available.

Returning now to step 812, if the status of the common resource is not equal to SET/WAY IN USE, then the method 800 proceeds to step 814, where the TOQ 430 determines whether the status of the common resource is equal to NEEDED BUT NOT AVAILABLE. A status of NEEDED BUT NOT AVAILABLE indicates that the TOQ entry was put to sleep because the common resource is needed by the TOQ, but the resource was not available. In such a case, the method 800 proceeds to step 822, as described above, to determine whether the resource is now available.

Returning now to step 814, if the status of the common resource is not equal to NEEDED BUT NOT AVAILABLE, then the method 800 proceeds to step 816, as described above.

Once a TOQ is awake and active, the TOQ 430 may select the TOQ for one or more replay operations in order that the associated access request may resume execution.

FIG. 9 is a flow diagram of method steps for selecting a common resource access request in a total order queue (TOQ) 430 for servicing, according to one embodiment of the present invention. Although the method steps are described in conjunction with the systems of FIGS. 1-5, persons of ordinary skill in the art will understand that any system configured to perform the method steps, in any order, is within the scope of the present invention.

As shown, the method 900 begins at step 902, where the TOQ 430 initializes an index to point at a first partition within the SM 310. At step 904, the TOQ 430 calculates the TOQ index for the highest numbered TOQ entry. At step 906, the TOQ 430 determines whether the TOQ entry referenced by the TOQ index is a valid TOQ entry and that the partition referenced by the partition index is a valid partition. The TOQ entry is invalid if the associated access request has completed and the TOQ entry has subsequently been retired. A partition is valid if the partition has been identified to execute the access request associated with the TOQ entry. If the TOQ entry or the partition is not valid, then the method 900 proceeds to step 908, where the TOQ 430 decrements the index. At step 910, the TOQ 430 determines whether the index is greater than or equal to zero. If the index is greater than or equal to zero, then the method 900 returns to step 908, as described above.

If the index is not greater than or equal to zero, then the entire TOQ has been scanned, and the method 900 proceeds to step 916, where the TOQ 430 increments the partition index. At step 918, the TOQ 430 determines whether the partition index is less than the number of partitions, P. If the partition index is less than P, then the method 900 returns to step 904, as described above. If the partition index is not less than P, then the entire set of SM partitions has been scanned, and the method 900 proceeds to step 920, where the TOQ 430 sends any found replay operation requests to the respective SM partitions. The method 900 then terminates.

Returning now to step 906, if the TOQ entry and the partition are both valid, then the method 900 proceeds to step 912, where the TOQ 430 determines whether each common resource is either not needed by the TOQ entry, or the common resource is needed by and has been allocated to the TOQ entry. If not all needed resources have been allocated to the TOQ entry, then the method 900 returns to step 908, as described above. If all needed resources have been allocated to the TOQ entry, then the method 900 proceeds to step 914, where the TOQ 430 selects a replay instruction buffer within the identified partition to execute the access request. The method 900 then proceeds to step 916, as described above.

Figure 10:
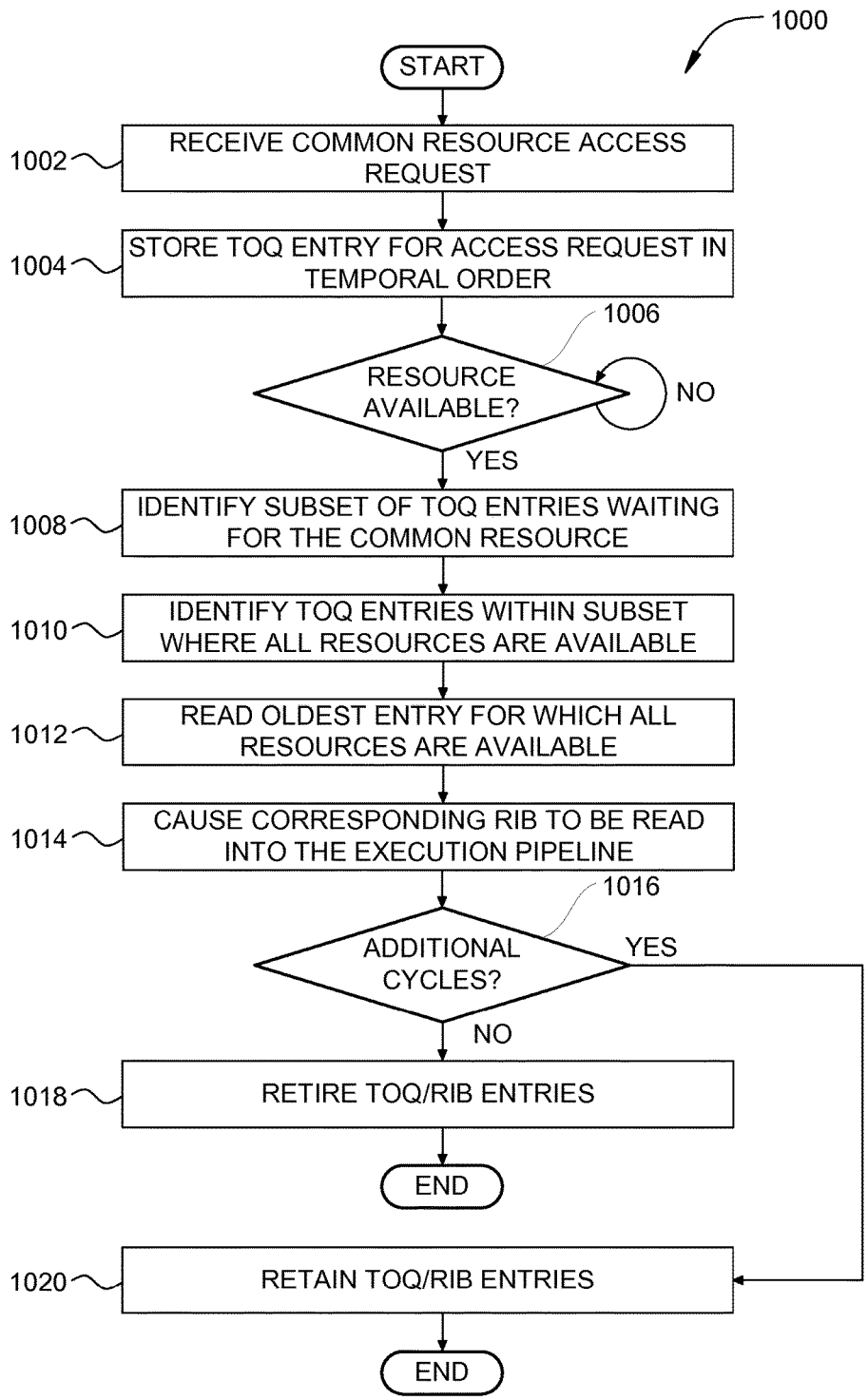
FIG. 10 is a flow diagram of method steps for aging TOQ entries in a TOQ entry buffer, according to one embodiment of the present invention.

FIG. 10 is a flow diagram of method steps for aging TOQ entries in a TOQ entry buffer 432, according to one embodiment of the present invention. Although the method steps are described in conjunction with the systems of FIGS. 1-5, persons of ordinary skill in the art will understand that any system configured to perform the method steps, in any order, is within the scope of the present invention.

As shown, the method 1000 begins at step 1002, where the TOQ 430 receives a new common resource access request. At step 1004, the TOQ 430 creates and stores a TOQ entry corresponding to the access request in the TOQ entry buffer 432, where the entries in the TOQ buffer are stored in temporal order. Temporal order may be determined in any technically feasible manner including, without limitation, via a priority scheme, least-recently-used, or least-recently-allocated approaches, arrival time and position of the common resource access request within the TOQ entry buffer 432, or by arrival time and position of a replay operation associated with the common resource access request within the TOQ entry buffer 432. The TOQ entry corresponding to the new access request may occupy the position in the TOQ entry buffer 432 corresponding to the newest position in the buffer. Each TOQ entry is shifted one position in the TOQ entry buffer 432 until an empty position in the TOQ entry buffer 432 is found. The empty position is filled with an existing TOQ entry. The empty position may be the oldest valid TOQ entry in the TOQ entry buffer 432. Alternatively, the empty position may be a "bubble" where newer valid TOQ entries existing on one side of the empty position, and older valid TOQ entries existing on the other side of the empty position. In such a case, filling the empty position fills in the "bubble" within the TOQ entry buffer 432.

At step, 1006, the TOQ 430 determines whether a first common resource needed by the access request is available for allocation. If the first common resource is not available, then the TOQ waits until the resource becomes available. If, at step 1006, the first common resource is available, then the method 1000 proceeds to step 1008, where the TOQ 430 searches the TOQ entry buffer 432 to identify a subset of TOQ entries that correspond to access requests waiting for the first common resource. At step 1010, the TOQ 430 identifies the TOQ entries within the subset of TOQ entries, where all needed common resources, including the first common resource, are available.

At step 1012, the TOQ 430 reads the oldest entry in the TOQ entry buffer in the subset of TOQ entries, where all needed common resources, including the first common resource, are available. This TOQ entry may or may not be the oldest valid TOQ entry in the TOQ entry buffer 432. At step 1014, the TOQ 430 causes a RIB entry, corresponding to the TOQ entry read in step 1012, to be read into the processing pipeline in order to execute one or more cycles of the access request. At step 1016, the TOQ 430 determines whether additional cycles are required in order to complete the access request. If no additional cycles are required, then the method 1000 proceeds to step 1018, where the TOQ 430 retires the TOQ entry corresponding to the access request. The TOQ 430 may also cause the corresponding RIB entry to be retired. If the TOQ entry being retired is not the last valid request in the TOQ entry buffer 432, then a "hole" or "bubble" may be created within the TOQ entry buffer 432, such that valid TOQ entries exist on both sides of the bubble. The method 1000 then terminates.

If, at step 1016, additional cycles are required, then the method 1000 proceeds to step 1020, where the TOQ 430 retains the TOQ entry corresponding to the access request. The TOQ 430 may also cause the corresponding RIB entry to be retained. The method 1000 then terminates.

Figure 11:
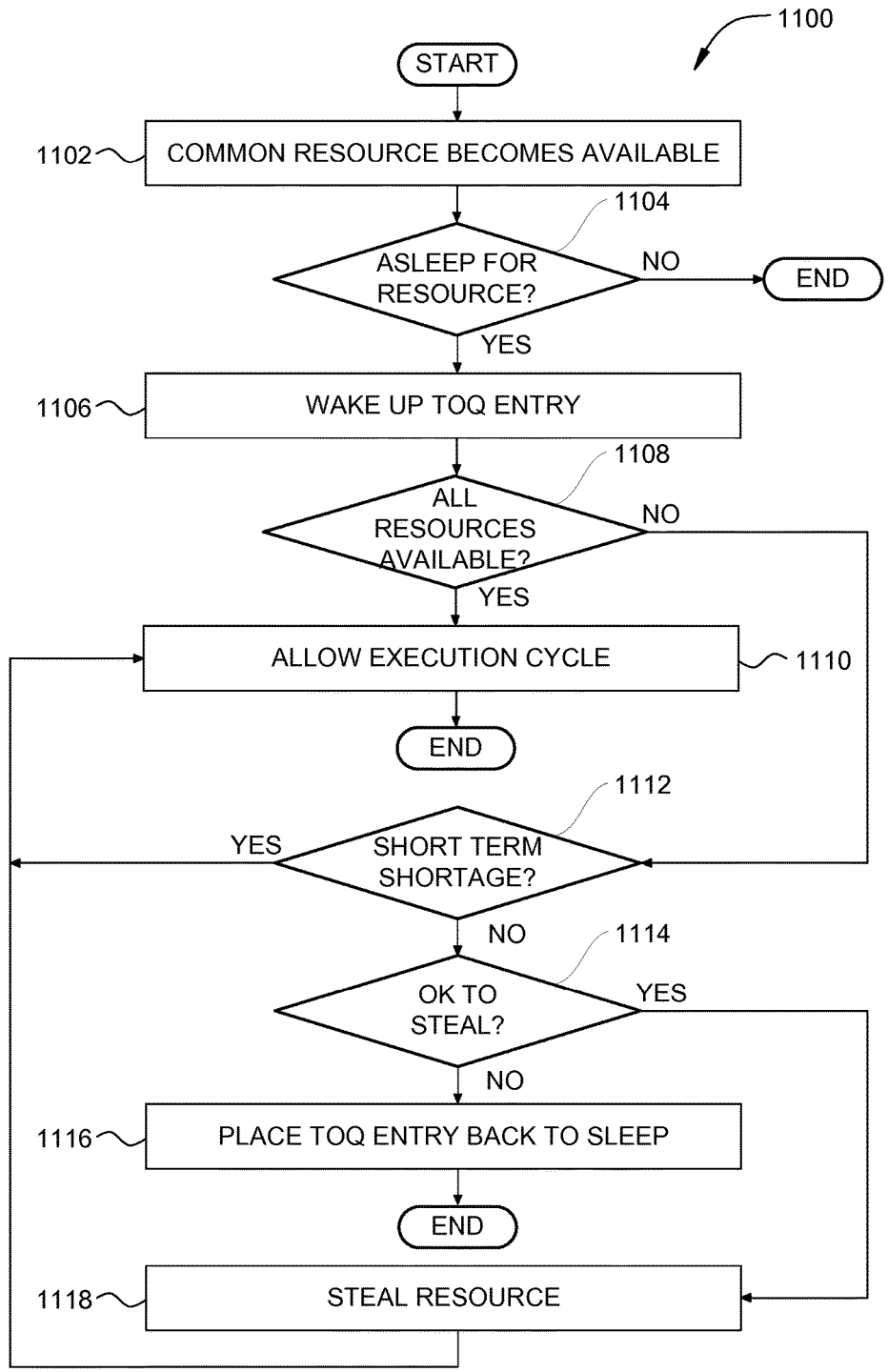
FIG. 11 is a flow diagram of method steps for transitioning a TOQ entry associated with a common resource access request from a sleep state to an active state, according to one embodiment of the present invention.

FIG. 11 is a flow diagram of method steps for transitioning a TOQ entry associated with a common resource access request from a sleep state to an active state, according to one embodiment of the present invention. Although the method steps are described in conjunction with the systems of FIGS. 1-5, persons of ordinary skill in the art will understand that any system configured to perform the method steps, in any order, is within the scope of the present invention.

As shown, the method 1100 begins at step 1102, where the TOQ 430 determines that a common resource is now available for allocation to access requests. At step 1104, the TOQ 430 determines whether a TOQ entry within the TOQ entry buffer 432 is in a sleep state, where a wake-up condition of the TOQ entry is satisfied when the common resource is available. If no TOQ entry is waiting for the common resource, then the method 1100 terminates.

If at step 1104, one or more TOQ entries are waiting for the common resource, the method proceeds to step 1106, where the TOQ 430 issues a wake-up operation. The wake-up operation may be issued as a single wake-up operation to a specific TOQ entry. Alternatively, the wake-up operation may be broadcast to multiple TOQ entries that are waiting for the common resource. At step 1108, the TOQ 430 determines whether the TOQ entry receiving the wake-up in step 1106 is waiting for other common resources that remain unavailable. If the TOQ entry is not waiting for other unavailable resources, then the method 1100 proceeds to step 1110, where the TOQ 430 allows one or more cycles of the access request to execute. The method 1100 then terminates.

If, at step 1108, the TOQ entry is waiting for other unavailable resources, then the method 1100 proceeds to step 1112, where the TOQ 430 determines whether the unavailable resources are unavailable on a short-term or transient basis. If the resources are unavailable for a short term, then the method 1100 proceeds to step 1110, as above. If the resources are unavailable for a long term, then the method 1100 proceeds to step 1114, where the TOQ 430 determines whether the unavailable resources may be stolen from another TOQ entry. If the unavailable resources may not be stolen, then the method proceeds to step 1116, where the TOQ 430, places the TOQ entry back into a sleep state. The method 1100 then terminates.

If, at step 1114, the unavailable resources may be stolen, then the method 1100 proceeds to step 1118, where the TOQ 430 steals the unavailable resources from other TOQ entries. The TOQ 430 may steal the resource via physical stealing or virtual stealing as described above in conjunction with FIG. 4. In one example, the unavailable resources may be stolen only after a predetermined amount of time has elapsed. In another example, only the oldest valid TOQ entry may be eligible to steal resources from other TOQ entries. The method 1100 then proceeds to step 1110, as above.

It should be appreciated that the architecture described herein is illustrative only and that variations and modifications are possible. For example, the architecture described herein is presented in the context of a load-store unit 303 of a streaming multiprocessor 310, but may be employed in any processing unit that accesses common resources, including, without limitation, in association with a central processing unit (CPU), general processing unit (GPU), or in any other technically feasible compute environment. In yet another example, each RIB 416 need not have an identical number of entries, so long at the TOQ 430 is configured to track the entries within each RIB 416. In another example, the techniques are described within the context of multiple SM partitions 410 and other clients competing for a common execution unit. However, other configurations are supported within the context of the disclosed techniques, including, without limitation, a single client accessing multiple execution units or multiple clients accessing multiple execution units. The various clients may be serviced in any technically feasible manner, including, without limitation, a rotating time slice order, priority-based approaches, or dynamic loading. In yet another example, the disclosed TOQ 430 is described in the context of a centralized control unit servicing multiple SM partitions 410 and other request sources for a common execution unit. Alternatively, decentralized control may be employed where each SM partition 410 and client may manage a separate sub-TOQ, where the age of each request is relative to each sub-TOQ. In such a case, a global aging mechanism may be employed for selective wakeup operations.

The techniques described herein are described with respect to common resource access operations, such as load and store access requests across multiple threads where the threads access memory locations across divergent cache lines. The techniques are sufficiently flexible to be employed in other applications where common resource access requests are present. In one example, the techniques described herein are not limited to execution of threads, but may be employed for any operations which may proceed via multiple functional processing units that access common resources. In another example, an instruction may diverge across a common resource other than cache lines within a cache. Such resources may include, without limitation, cache tags, cache data, register banks, and shared memory. The threads executing the common resource access request may access different aspects or portions of the common resource, such as different sets within a cache memory or different ways within a cache set. In yet another example, the LSU 303 may retrieve multiple common resources, such as multiple cache lines, during any given operation. In yet another example, a given common resource may have more than one simultaneous access port, where access is denied when all available access ports are consumed by other requestors.

Persons of ordinary skill in the art will appreciate that the common resource configurations described herein are illustrative only and that variations and modifications are possible. For example, although some common resources are described herein as having a set and a way, as is typical in a set-associative cache, other common resource configurations could be employed in the context of the described techniques, including, without limitation, direct mapped caches (typically having one way per set), fully associative caches (typically having one set), and sectored caches, in any combination. In a sectored cache, a cache line, as represented by a set and a way, could be further sub-divided into sectors. In such a configuration, the TOQ 430 could track common resource usage by sector in addition to tracking by set and way. In another example, various cache line replacement policies could be employed, including, without limitation, least recently used (LRU) and least recently allocated (LRA) approaches.

In sum, the disclosed technique provides an optimized way to maintain fairness and order in the scheduling of common resource access requests related to replay operations. Specifically, a streaming multiprocessor (SM) 310 includes a total order queue (TOQ) 430 configured to schedule the access requests over one or more replay operations for access request that do not complete in a single execution cycle. If all common resources have been allocated to the access request or are otherwise available, then the access request is allowed to execute one or more replay operations. If the access request is waiting for at least one long-term resource, the TOQ 430 places the access request in a sleep state pending availability of the resource. The TOQ entry associated with the access request is placed in an awake state when a needed resource becomes available. Priority is given to access requests according to the age of the access request and the status of common resources. When two or more access requests are deadlocked waiting for the same resources, the TOQ may allow the older access request to steal resources from the younger resource request, such that each access request is able to complete execution.

Advantageously, older common resource access requests are not repeatedly blocked from making forward progress by newer access requests. Priority inversions are avoided by allocating the common resource to an existing older access request in preference to the new access request. The resources of the SM 310 are utilized more efficiently because access requests in the sleep state do not actively compete for common resources. Additionally, deadlock and livelock is avoided by allowing an older TOQ entry to steal resources allocated to a younger entry, such that the access request associated with the older entry is able to complete execution, followed by the access request associated with the younger entry. Further, fairness and order in scheduling access requests is maintained even as the set of common resources needed changes during execution.

While the foregoing is directed to embodiments of the present invention, other and further embodiments of the invention may be devised without departing from the basic scope thereof, and the scope thereof is determined by the claims that follow.

What is claimed is:

1. A method for waking up a request for a common resource, where the request has been put to sleep within a buffer, the method comprising:
   determining that a first common resource is available for allocation to any request included in a plurality of requests;
   determining that the availability of the first common resource satisfies a first wake-up condition for a first request included in the plurality of requests that has been put to sleep within the buffer, wherein a second common resource needed by the first request remains unavailable;
   in response, waking up the first request so that the first request can be further analyzed for execution;
   determining, at a total order queue, that the unavailability of the second common resource is a transient condition; and
   in response, allowing the execution of a first cycle of the first request.

2. The method of claim 1, wherein a second common resource remains unavailable for the first request, and further comprising preventing any cycles of the first request from executing until the second common resource becomes available.

3. The method of claim 1, wherein a second common resource remains unavailable for the first request, and further comprising putting the first request back to sleep until the second common resource becomes available.

4. The method of claim 1, wherein a second common resource remains unavailable for the first request because the second common resource has been made available to a second request, and further comprising stealing the second common resource from the second request so that the second common resource is available to the first request.

5. The method of claim 4, wherein stealing the second common resource comprises changing an entry in the buffer corresponding to the second request to indicate that the second common resource is not available to the second request.

6. The method of claim 4, wherein stealing the second common resource occurs only after a predetermined amount of time has elapsed.

7. The method of claim 4, wherein the first request corresponds to an entry in the buffer that is the entry that has been sleeping in the buffer longer than any other request included in the plurality of requests.

8. The method of claim 1, further comprising determining that the availability of the first common resource satisfies a first wake-up condition for one or more other requests, and waking up the one or more other requests so that the one or more other requests can be further analyzed for execution.

9. The method of claim 8, wherein a broadcast wake-up operation is implemented to wake up the first request and the one or more other requests.

10. The method of claim 1, further comprising, in response to waking up the first request, analyzing the first request for execution.

11. The method of claim 1, wherein, upon determining that the unavailability of the second common resource is a transient condition, the first request is eligible for execution immediately.

12. The method of claim 1, wherein, upon determining that the unavailability of the second common resource is a transient condition, the first request is eligible for execution after a finite delay.

13. A subsystem for waking up a request for a common resource, where the request has been put to sleep within a buffer, comprising:
 a processor that executes a total order queue (TOQ) configured to perform the steps of:
 determining that a first common resource is available for allocation to any request included in a plurality of requests;
 determining that the availability of the first common resource satisfies a first wake-up condition for a first request included in the plurality of requests that has been put to sleep within the buffer, wherein a second common resource needed by the first request remains unavailable;
 in response, waking up the first request so that the first request can be further analyzed for execution;
 determining that the unavailability of the second common resource is a transient condition; and
 in response, allowing the execution of a first cycle of the first request.

14. The subsystem of claim 13, wherein a second common resource remains unavailable for the first request, and the TOQ is further configured to perform the step of preventing any cycles of the first request from executing until the second common resource becomes available.

15. The subsystem of claim 13, wherein a second common resource remains unavailable for the first request, and the TOQ is further configured to perform the step of putting the first request back to sleep until the second common resource becomes available.

16. The subsystem of claim 13, wherein a second common resource remains unavailable for the first request because the second common resource has been made available to a second request, and the TOQ is further configured to perform the step of stealing the second common resource from the second request so that the second common resource is available to the first request.

17. The subsystem of claim 16, wherein stealing the second common resource comprises changing an entry in the buffer corresponding to the second request to indicate that the second common resource is not available to the second request.

18. The subsystem of claim 16, wherein stealing the second common resource occurs only after a predetermined amount of time has elapsed.

19. The subsystem of claim 16, wherein the first request corresponds to an entry in the buffer that is the entry that has been sleeping in the buffer longer than any other request included in the plurality of requests.

20. The subsystem of claim 13, further comprising determining that the availability of the first common resource satisfies a first wake-up condition for one or more other requests, and waking up the one or more other requests so that the one or more other requests can be further analyzed for execution.

21. A computing device, comprising:
 a processor that executes a total order queue (TOQ) configured to wake up a request for a common resource, where the request has been put to sleep within a buffer by performing the steps of:
 determining that a first common resource is available for allocation to any request included in a plurality of requests;
 determining that the availability of the first common resource satisfies a first wake-up condition for a first request included in the plurality of requests that has been put to sleep within the buffer, wherein a second common resource needed by the first request remains unavailable;
 in response, waking up the first request so that the first request can be further analyzed for execution;
 determining that the unavailability of the second common resource is a transient condition; and
 in response, allowing the execution of a first cycle of the first request.

* * * * *